(12) United States Patent
McCullough et al.

(10) Patent No.: US 10,618,646 B2
(45) Date of Patent: Apr. 14, 2020

(54) ROTOR ASSEMBLY HAVING A BALL JOINT FOR THRUST VECTORING CAPABILITIES

(71) Applicant: Bell Textron Inc., Fort Worth, TX (US)

(72) Inventors: John Richard McCullough, Fort Worth, TX (US); Paul K. Oldroyd, Fort Worth, TX (US); Mark Adam Wiinikka, Fort Worth, TX (US); Jouyoung Jason Choi, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 350 days.

(21) Appl. No.: 15/606,275

(22) Filed: May 26, 2017

(65) Prior Publication Data

US 2018/0339773 A1 Nov. 29, 2018

(51) Int. Cl.
*B64C 29/00* (2006.01)
*B64C 27/54* (2006.01)
(Continued)

(52) U.S. Cl.
CPC ............ *B64C 29/0033* (2013.01); *B64C 3/10* (2013.01); *B64C 27/32* (2013.01); *B64C 27/52* (2013.01); *B64C 27/54* (2013.01); *B64C 39/08* (2013.01)

(58) Field of Classification Search
CPC ......... B64C 27/52; B64C 11/46; B64C 27/54; B64C 29/0033; B64C 27/59; B64C 27/605
See application file for complete search history.

(56) References Cited

U.S. PATENT DOCUMENTS

| 1,655,113 A | 1/1928 | Tesla |
| 2,415,999 A | 2/1947 | Frasher |

(Continued)

FOREIGN PATENT DOCUMENTS

| CN | 105539833 A | 5/2016 |
| FR | 2977865 A3 | 1/2013 |

(Continued)

OTHER PUBLICATIONS

J.B.W. Edwards, Free-Flight Measurements of the Drag and Longitudinal Stability of a Transonic M-Wing Aircraft, Ministry of Aviation, Aeronautical Research Council Current Papers No. 773, 1964 (Year: 1964).*

(Continued)

*Primary Examiner* — Valentina Xavier
(74) *Attorney, Agent, or Firm* — Lawrence Youst PLLC

(57) ABSTRACT

A rotor assembly for an aircraft is operable to generate a variable thrust vector. The rotor assembly includes a mast that is rotatable about a mast axis. A ball joint is positioned about and non rotatable with the mast. A tilt control assembly is positioned on and has a tilting degree of freedom relative to the ball joint. The tilt control assembly is non rotatable with the mast. A rotor hub is rotatably coupled to the tilt control assembly. The rotor hub is rotatable with the mast in a rotational plane and tiltable with the tilt control assembly. The rotor hub includes a plurality of grips each coupled to a rotor blade. Actuation of the tilt control assembly changes the rotational plane of the rotor hub relative to the mast axis, thereby generating the variable thrust vector.

20 Claims, 18 Drawing Sheets

(51) Int. Cl.
*B64C 39/08* (2006.01)
*B64C 27/52* (2006.01)
*B64C 27/32* (2006.01)
*B64C 3/10* (2006.01)

(56) References Cited

U.S. PATENT DOCUMENTS

| | | |
|---|---|---|
| 2,501,227 A | 3/1950 | Lewis |
| 2,506,210 A | 5/1950 | Goodson et al. |
| 2,580,312 A | 12/1951 | Moore |
| 2,655,997 A * | 10/1953 | Peterson ............... B64C 27/54 416/103 |
| 3,002,712 A | 10/1961 | Beckwith |
| 3,050,274 A * | 8/1962 | Haight ............... B64C 27/26 244/7 R |
| 3,081,964 A | 3/1963 | Quenzler |
| 3,176,774 A * | 4/1965 | Krinsky ............... B64C 27/52 244/17.19 |
| 3,181,810 A | 5/1965 | Olson |
| 3,259,343 A | 7/1966 | Roppel |
| 3,289,980 A | 12/1966 | Gardner |
| 3,350,035 A | 10/1967 | Schlieben |
| 3,592,412 A | 7/1971 | Glatfelter |
| 3,618,875 A | 11/1971 | Kappus |
| 3,720,387 A * | 3/1973 | Foote ............... B64C 27/54 244/17.25 |
| 3,783,618 A | 1/1974 | Kawamura |
| 3,916,588 A | 11/1975 | Magill |
| 4,458,864 A | 7/1984 | Colombo et al. |
| 4,534,524 A | 8/1985 | Aldrich |
| 4,571,157 A | 2/1986 | Eickmann |
| 4,596,368 A | 6/1986 | Schmittle |
| 4,613,098 A | 9/1986 | Eickmann |
| 4,726,736 A | 2/1988 | Breuner |
| 4,771,967 A | 9/1988 | Geldbaugh |
| 4,913,377 A | 4/1990 | Eickmann |
| 5,131,605 A | 7/1992 | Kress |
| 5,592,894 A | 1/1997 | Johnson |
| 5,842,667 A | 12/1998 | Jones |
| 6,086,015 A | 7/2000 | MacCready |
| 6,170,778 B1 | 1/2001 | Cycon et al. |
| 6,260,793 B1 | 7/2001 | Balayn et al. |
| 6,270,038 B1 | 8/2001 | Cycon et al. |
| 6,402,088 B1 | 6/2002 | Syrovy et al. |
| 6,655,631 B2 | 12/2003 | Austen-Brown |
| 6,712,313 B2 * | 3/2004 | Zoppitelli ............ B64C 29/0033 244/17.11 |
| 6,845,939 B1 | 1/2005 | Baldwin |
| 6,886,776 B2 | 5/2005 | Wagner et al. |
| 6,892,980 B2 | 5/2005 | Kawai |
| 7,059,562 B2 | 6/2006 | Baldwin |
| 7,137,591 B2 * | 11/2006 | Carter ............... B64C 27/52 244/17.27 |
| 7,150,429 B2 | 12/2006 | Kusic |
| 7,210,654 B1 | 5/2007 | Cox et al. |
| 7,326,036 B1 * | 2/2008 | Habin ............... B64C 27/59 416/148 |
| 7,465,236 B2 | 12/2008 | Wagels |
| 7,472,863 B2 | 1/2009 | Pak |
| 7,555,893 B2 | 7/2009 | Okai et al. |
| 7,984,684 B2 | 7/2011 | Hinderks |
| 8,152,096 B2 | 4/2012 | Smith |
| 8,197,205 B2 | 6/2012 | Rudley et al. |
| 8,235,324 B2 | 8/2012 | Birch et al. |
| 8,505,846 B1 | 8/2013 | Sanders |
| 8,602,348 B2 | 12/2013 | Bryant |
| 8,733,690 B2 | 5/2014 | Bevirt et al. |
| 8,800,912 B2 | 8/2014 | Oliver |
| 8,820,672 B2 | 9/2014 | Erben et al. |
| 8,833,692 B2 | 9/2014 | Yoeli |
| 8,909,391 B1 | 12/2014 | Peeters et al. |
| 8,948,935 B1 | 2/2015 | Peeters et al. |
| 9,022,312 B2 | 5/2015 | Kosheleff |
| 9,045,226 B2 | 6/2015 | Piasecki et al. |
| 9,087,451 B1 | 7/2015 | Jarrell |
| 9,108,744 B2 | 8/2015 | Takeuchi |
| 9,109,575 B2 | 8/2015 | Weddendorf et al. |
| 9,120,560 B1 | 9/2015 | Armer et al. |
| 9,127,908 B2 | 9/2015 | Miralles |
| 9,162,753 B1 | 10/2015 | Panto et al. |
| 9,162,759 B2 | 10/2015 | Hirsch |
| 9,174,728 B2 | 11/2015 | Altmikus et al. |
| 9,187,174 B2 | 11/2015 | Shaw |
| 9,193,460 B2 | 11/2015 | Laudrain |
| 9,199,733 B2 | 12/2015 | Keennon et al. |
| 9,221,538 B2 | 12/2015 | Takahashi et al. |
| 9,242,714 B2 | 1/2016 | Wang et al. |
| 9,254,916 B2 | 2/2016 | Yang |
| 9,284,049 B1 | 3/2016 | Wang et al. |
| 9,321,530 B2 | 4/2016 | Wang et al. |
| 9,376,208 B1 | 6/2016 | Gentry |
| 9,388,794 B2 | 7/2016 | Weddendorf et al. |
| 9,403,593 B2 | 8/2016 | Downey et al. |
| 9,440,736 B2 | 9/2016 | Bitar |
| 9,463,875 B2 | 10/2016 | Abuelsaad et al. |
| 9,493,225 B2 | 11/2016 | Wang et al. |
| 9,610,817 B1 | 4/2017 | Piasecki et al. |
| 9,643,720 B2 | 5/2017 | Hesselbarth |
| 9,694,908 B2 | 7/2017 | Razroev |
| 9,694,911 B2 | 7/2017 | Bevirt et al. |
| 9,714,087 B2 | 7/2017 | Matsuda |
| 9,821,909 B2 | 11/2017 | Moshe |
| 9,963,228 B2 | 5/2018 | McCullough et al. |
| 9,994,313 B2 | 6/2018 | Claridge et al. |
| 10,011,351 B2 | 7/2018 | McCullough et al. |
| 10,124,890 B2 | 11/2018 | Sada-Salinas et al. |
| 10,183,746 B2 | 1/2019 | McCullough et al. |
| 10,214,285 B2 | 2/2019 | McCullough et al. |
| 10,220,944 B2 | 3/2019 | McCullough et al. |
| 10,227,133 B2 | 3/2019 | McCullough et al. |
| 10,232,950 B2 | 3/2019 | McCullough et al. |
| 2002/0100834 A1 | 8/2002 | Baldwin |
| 2002/0100835 A1 | 8/2002 | Kusic |
| 2003/0062443 A1 | 4/2003 | Wagner et al. |
| 2004/0245374 A1 | 12/2004 | Morgan |
| 2005/0196275 A1 * | 9/2005 | Carson ............... F03B 1/00 415/211.2 |
| 2006/0091258 A1 | 5/2006 | Chiu et al. |
| 2006/0266881 A1 | 11/2006 | Hughey |
| 2007/0221780 A1 | 9/2007 | Builta |
| 2009/0008499 A1 | 1/2009 | Shaw |
| 2009/0184209 A1 * | 7/2009 | Rauber ............... B64C 29/0033 244/7 R |
| 2010/0147993 A1 | 6/2010 | Annati et al. |
| 2010/0266411 A1 * | 10/2010 | Stamps ............... B64C 29/0033 416/131 |
| 2010/0295321 A1 | 11/2010 | Bevirt |
| 2011/0042508 A1 | 2/2011 | Bevirt |
| 2011/0042509 A1 | 2/2011 | Bevirt et al. |
| 2011/0057453 A1 | 3/2011 | Roberts |
| 2011/0121570 A1 | 5/2011 | Bevirt et al. |
| 2011/0315806 A1 | 12/2011 | Piasecki et al. |
| 2012/0209456 A1 | 8/2012 | Harmon et al. |
| 2012/0234968 A1 | 9/2012 | Smith |
| 2013/0020429 A1 | 1/2013 | Kroo |
| 2013/0149150 A1 * | 6/2013 | Wiinikka ............... B64C 27/605 416/114 |
| 2013/0175404 A1 | 7/2013 | Shefer |
| 2014/0018979 A1 | 1/2014 | Goossen et al. |
| 2014/0169963 A1 * | 6/2014 | Carreker ............... B64C 27/52 416/1 |
| 2015/0012154 A1 | 1/2015 | Senkel et al. |
| 2015/0014475 A1 | 1/2015 | Taylor et al. |
| 2015/0053814 A1 * | 2/2015 | Stamps ............... F16D 3/42 244/17.11 |
| 2015/0136897 A1 | 5/2015 | Seibel et al. |
| 2015/0284079 A1 | 10/2015 | Matsuda |
| 2015/0285165 A1 | 10/2015 | Steinwandel et al. |
| 2016/0068265 A1 | 3/2016 | Hoareau et al. |
| 2016/0167777 A1 | 6/2016 | Podgurski |
| 2016/0180717 A1 | 6/2016 | Ubhi et al. |
| 2016/0214712 A1 | 7/2016 | Fisher et al. |
| 2016/0221675 A1 * | 8/2016 | Adam ............... B64C 27/82 |

(56) References Cited

U.S. PATENT DOCUMENTS

| | | |
|---|---|---|
| 2017/0021924 A1 | 1/2017 | Kubik et al. |
| 2017/0066531 A1 | 3/2017 | McAdoo |
| 2017/0097644 A1 | 4/2017 | Fegely et al. |
| 2017/0158312 A1 | 6/2017 | Alber et al. |
| 2017/0240274 A1 | 8/2017 | Regev |
| 2017/0297699 A1 | 10/2017 | Alber et al. |
| 2017/0327219 A1 | 11/2017 | Alber |
| 2017/0334557 A1 | 11/2017 | Alber et al. |
| 2018/0002005 A1* | 1/2018 | Groenewald ........... B64C 27/32 |
| 2018/0002013 A1 | 1/2018 | McCullough et al. |
| 2018/0002026 A1 | 1/2018 | Oldroyd et al. |
| 2018/0244383 A1 | 8/2018 | Valente et al. |
| 2018/0265193 A1 | 9/2018 | Gibboney et al. |
| 2018/0339769 A1* | 11/2018 | McCullough ........... B64C 27/54 |

FOREIGN PATENT DOCUMENTS

| | | |
|---|---|---|
| WO | 2001074659 A1 | 10/2001 |
| WO | 2005039973 A2 | 5/2005 |
| WO | 2014067563 A1 | 5/2014 |

OTHER PUBLICATIONS

Air Launched Unmanned Disaster Relief Delivery Vehicle, 33rd Annual AHS Student Design Competition, University of Maryland, Undated but admitted prior art.
Bell and NASA Partner for UAV Development; Transportup.com; Sep. 9, 2018.
Bell APT—Automatic Pod Transport; SUASNEWS.com; Dec. 6, 2017.
Bell Autonomous Pod Transport; MONCH.com; May 2, 2018.

* cited by examiner

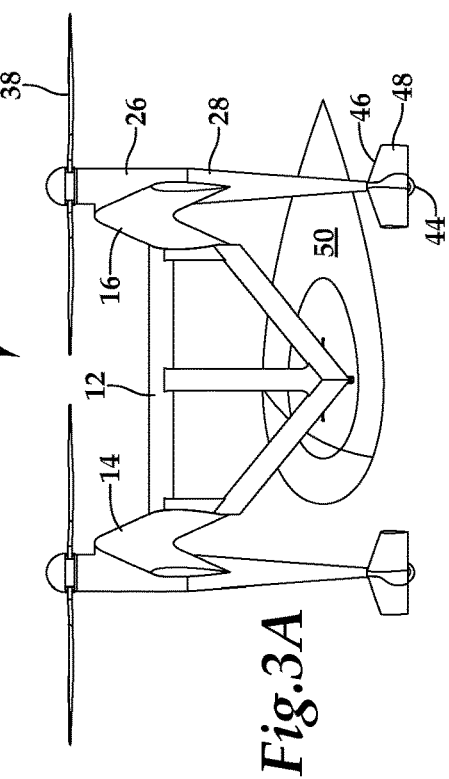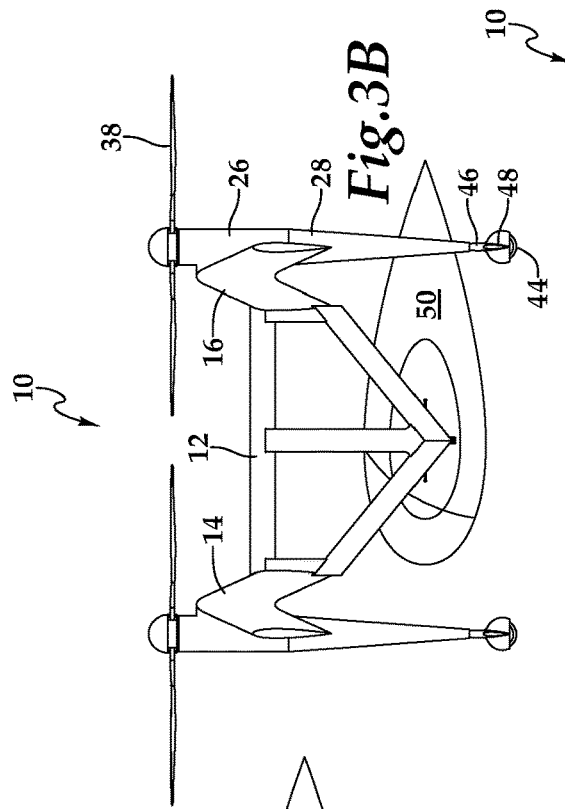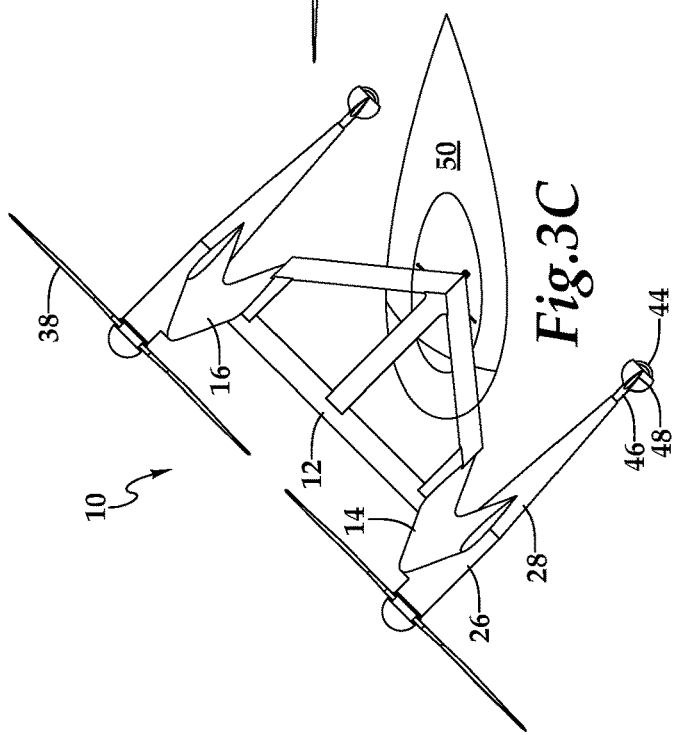

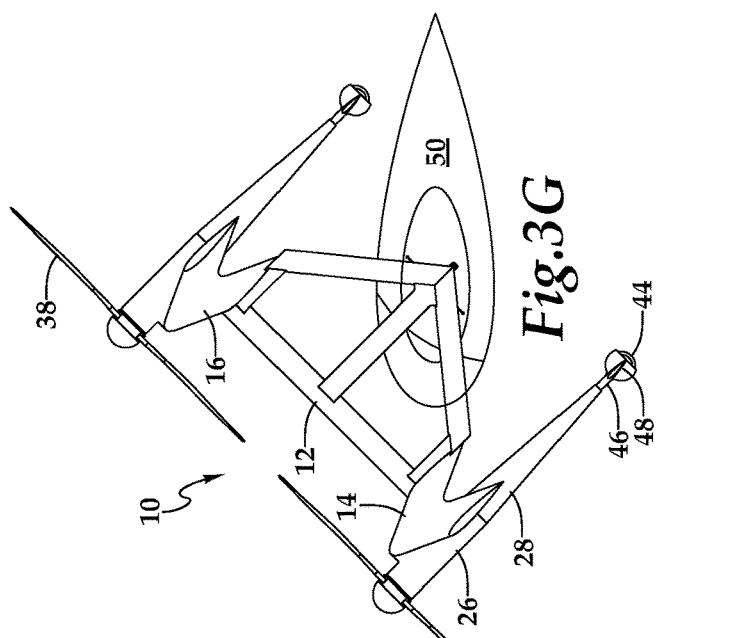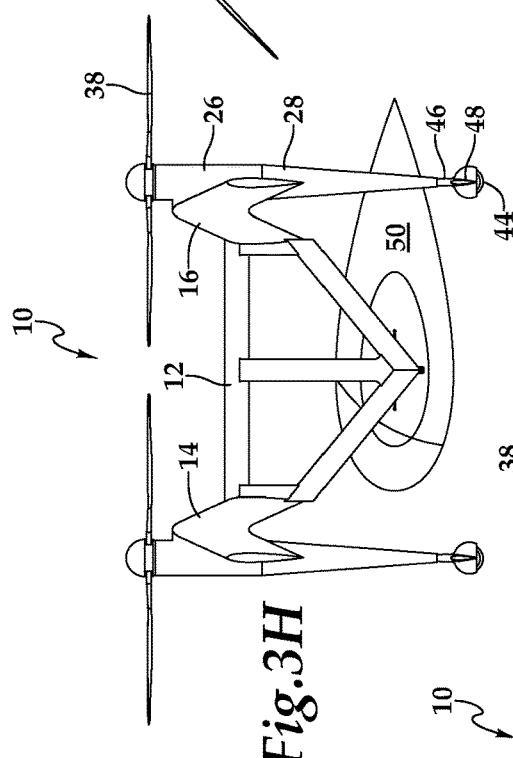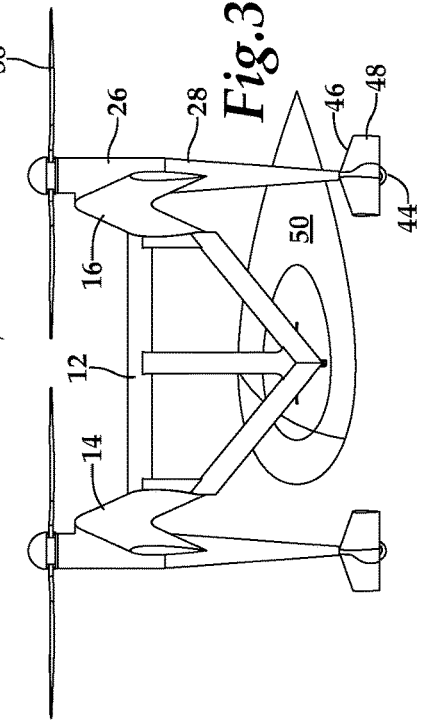

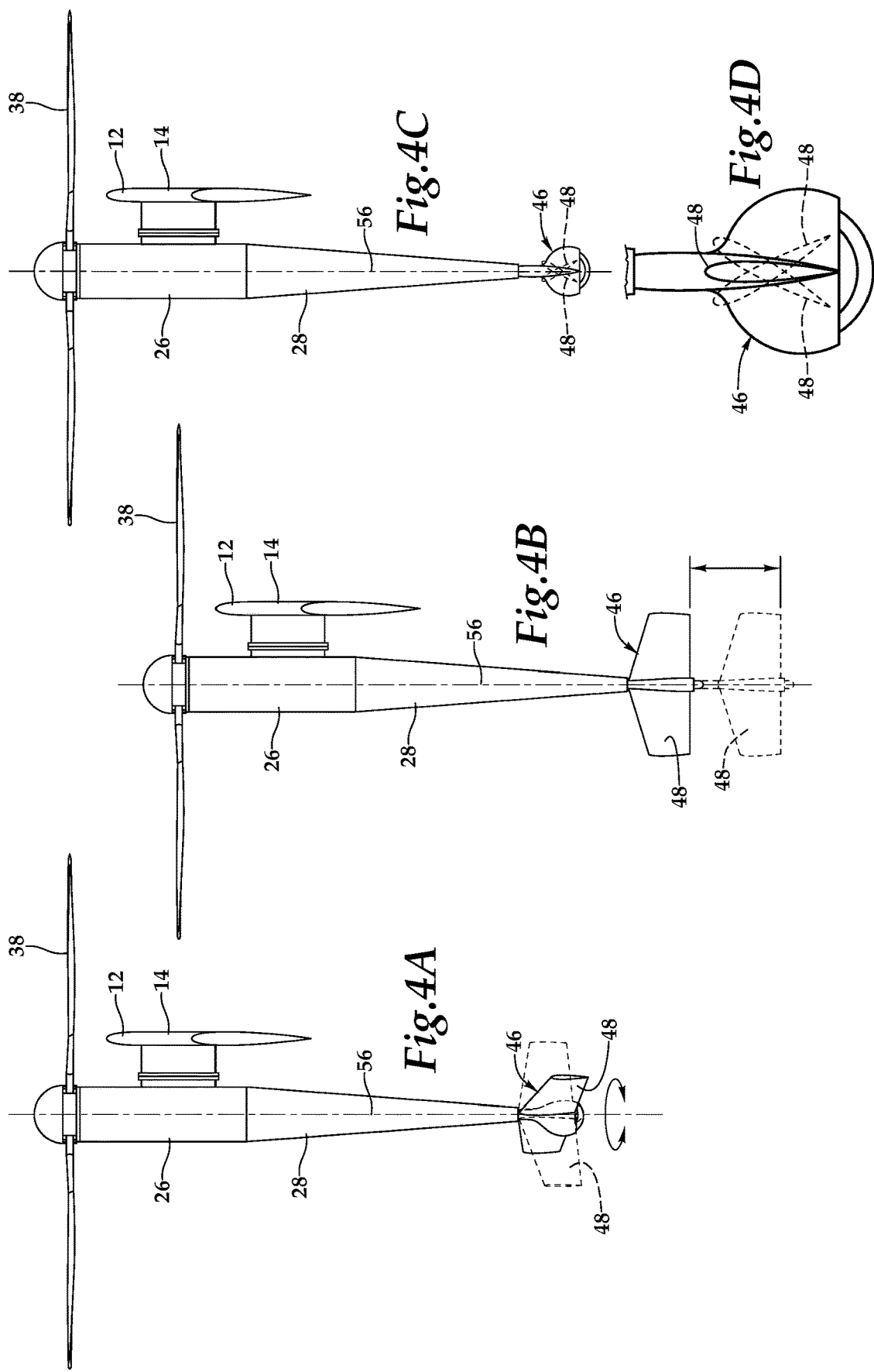

ROTOR ASSEMBLY HAVING A BALL JOINT FOR THRUST VECTORING CAPABILITIES

TECHNICAL FIELD OF THE DISCLOSURE

The present disclosure relates, in general, to aircraft operable to transition between a forward flight mode and a vertical takeoff and landing flight mode and, in particular, to aircraft having a distributed propulsion system including a plurality of rotor assemblies, each operable to generate a variable thrust output and a variable thrust vector at a constant rotational speed.

BACKGROUND

Fixed-wing aircraft, such as airplanes, are capable of flight using wings that generate lift responsive to the forward airspeed of the aircraft, which is generated by thrust from one or more jet engines or propellers. The wings generally have an airfoil cross section that deflects air downward as the aircraft moves forward, generating the lift force to support the airplane in flight. Fixed-wing aircraft, however, typically require a runway that is hundreds or thousands of feet long for takeoff and landing.

Unlike fixed-wing aircraft, vertical takeoff and landing (VTOL) aircraft do not require runways. Instead, VTOL aircraft are capable of taking off, hovering and landing vertically. One example of VTOL aircraft is a helicopter which is a rotorcraft having one or more rotors that provide lift and thrust to the aircraft. The rotors not only enable hovering and vertical takeoff and landing, but also enable, forward, backward and lateral flight. These attributes make helicopters highly versatile for use in congested, isolated or remote areas where fixed-wing aircraft may be unable to takeoff and land. Helicopters, however, typically lack the forward airspeed of fixed-wing aircraft.

A tiltrotor aircraft is another example of a VTOL aircraft. Tiltrotor aircraft generate lift and propulsion using proprotors that are typically coupled to nacelles mounted near the ends of a fixed wing. The nacelles rotate relative to the fixed wing such that the proprotors have a generally horizontal plane of rotation for vertical takeoff, hovering and landing and a generally vertical plane of rotation for forward flight, wherein the fixed wing provides lift and the proprotors provide forward thrust. In this manner, tiltrotor aircraft combine the vertical lift capability of a helicopter with the speed and range of fixed-wing aircraft. Tiltrotor aircraft, however, typically suffer from downwash inefficiencies during vertical takeoff and landing due to interference caused by the fixed wing.

A further example of a VTOL aircraft is a tiltwing aircraft that features a rotatable wing that is generally horizontal for forward flight and rotates to a generally vertical orientation for vertical takeoff and landing. Propellers are coupled to the rotating wing to provide the required vertical thrust for takeoff and landing and the required forward thrust to generate lift from the wing during forward flight. The tiltwing design enables the slipstream from the propellers to strike the wing on its smallest dimension, thus improving vertical thrust efficiency as compared to tiltrotor aircraft. Tiltwing aircraft, however, are more difficult to control during hover as the vertically tilted wing provides a large surface area for crosswinds typically requiring tiltwing aircraft to have either cyclic rotor control or an additional thrust station to generate a moment.

SUMMARY

In a first aspect, the present disclosure is directed to a rotor assembly for an aircraft operable to generate a variable thrust vector. The rotor assembly includes a mast that is rotatable about a mast axis. A ball joint is positioned about the mast and is non rotatable with the mast. A tilt control assembly is positioned on the ball joint and has a tilting degree of freedom relative to the ball joint. The tilt control assembly is non rotatable with the mast. A rotor hub is rotatably coupled to the tilt control assembly. The rotor hub is rotatable with the mast in a rotational plane and is tiltable with the tilt control assembly. The rotor hub includes a plurality of grips each coupled to one of a plurality of rotor blades. In operation, actuation of the tilt control assembly changes the rotational plane of the rotor hub relative to the mast axis, thereby generating the variable thrust vector.

In some embodiments, the tilt control assembly includes a tilting plate and a plurality of actuators operable to tilt the tilting plate about the ball joint to change the rotational plane of the rotor hub relative to the mast axis and enable resolution of the thrust vector within a thrust vector cone. In such embodiments, the thrust vector cone may preferably have a maximum angle relative to the mast axis of between about ten degrees and about thirty degrees, more preferably between about fifteen degrees and about twenty-five degrees and/or most preferably about twenty degrees. In certain embodiments, a low friction bearing assembly, such as a ball bearing assembly, may be disposed between the tilt control assembly and the rotor hub to enable relative rotation therebetween. In some embodiments, a constant velocity joint assembly may provide a torque path from the mast to the rotor hub. In such embodiments, the rotor hub may include a drive arm assembly that is operable to rotate with and translate relative to the constant velocity joint assembly during rotary operations. In certain embodiments, each of the grips may be a spindle grip operable to rotate with a respective rotor blade about a pitch change axis. In such embodiments, a collective pitch control mechanism may be coupled to and rotatable with the rotor hub. The collective pitch control mechanism may be actuated to rotate each of the spindle grips about the respective pitch change axis to collectively adjust the pitch of the rotor blades.

In a second aspect, the present disclosure is directed to an aircraft that includes an airframe, a propulsion system having a plurality of propulsion assemblies each with a rotor assembly and a flight control system operable to independently control each of the propulsion assemblies. Each of the rotor assemblies includes a mast that is rotatable relative to the airframe about a mast axis. A ball joint is positioned about the mast and is non rotatable with the mast. A tilt control assembly is positioned on the ball joint and has a tilting degree of freedom relative to the ball joint. The tilt control assembly is non rotatable with the mast. A rotor hub is rotatably coupled to the tilt control assembly. The rotor hub is rotatable with the mast in a rotational plane and is tiltable with the tilt control assembly. The rotor hub includes a plurality of grips each coupled to one of a plurality of rotor blades. In operation, actuation of the tilt control assembly changes the rotational plane of the rotor hub relative to the mast axis, thereby generating the variable thrust vector.

In some embodiments, the airframe may include first and second wings each having an M-wing design with two leading apexes such that each of the rotor assemblies is positioned proximate one of the leading apexes, thereby enabling resolution of the thrust vector within a thrust vector cone. In certain embodiments, a passenger pod assembly may be rotatably attachable to the airframe such that the passenger pod assembly remains in a generally horizontal attitude in a vertical takeoff and landing fight mode, a forward flight mode and transitions therebetween. In some embodiments, the flight control system may command operation of the propulsion assemblies responsive to at least one of onboard pilot flight control, remote flight control, autonomous flight control and combinations thereof.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 3A-3I are schematic illustrations of an aircraft in a sequential flight operating scenario in accordance with embodiments of the present disclosure;

FIGS. 4A-4D are schematic illustrations of a propulsion assembly for an aircraft in accordance with embodiments of the present disclosure;

DETAILED DESCRIPTION

Figure 1B:
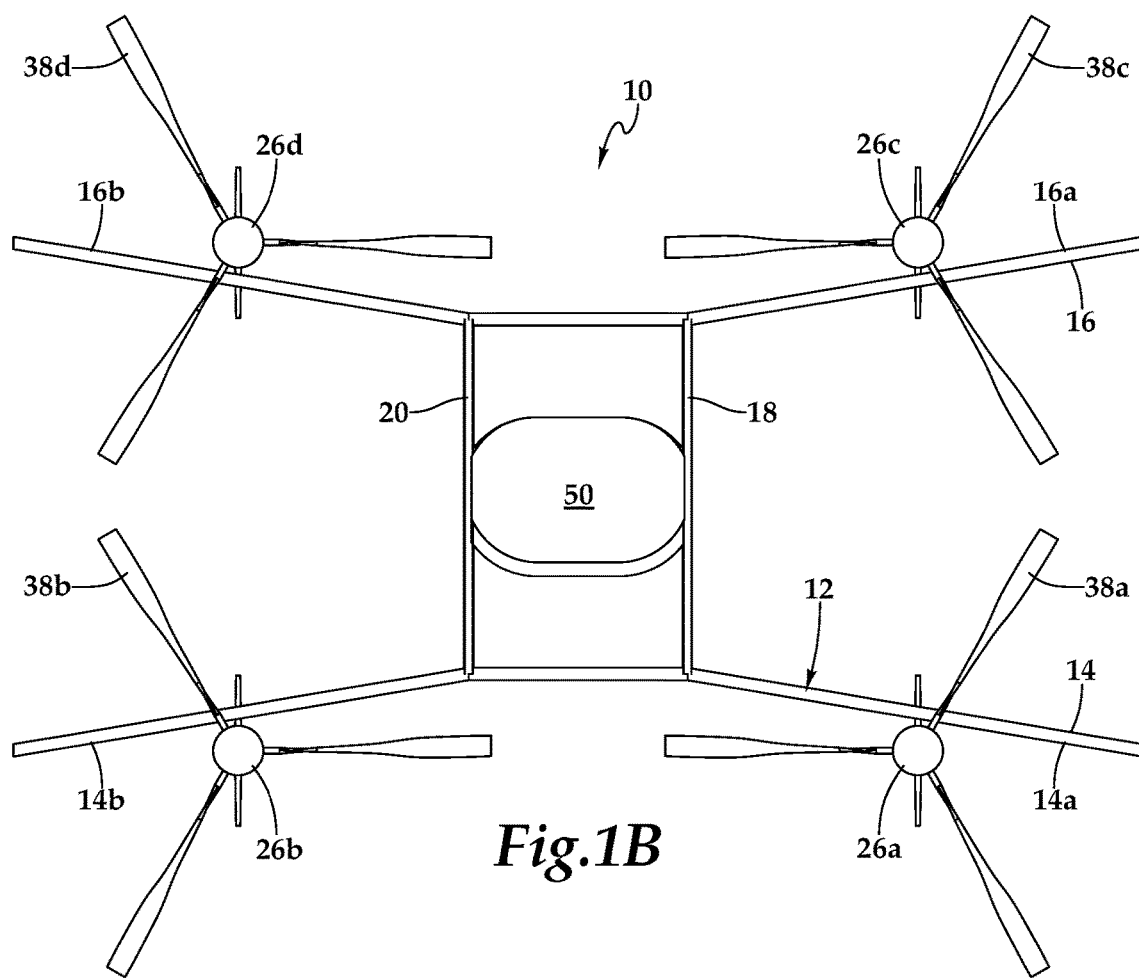
FIGS. 1A-1F are schematic illustrations of an aircraft in accordance with embodiments of the present disclosure.

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Referring to FIGS. 1A-1F in the drawings, various views of an aircraft 10 having a versatile propulsion system are depicted. In the illustrated embodiment, aircraft 10 including an airframe 12 having wings 14, 16 each have an airfoil cross-section that generates lift responsive to the forward airspeed of aircraft 10. Wings 14, 16 may be formed as single members or may be formed from multiple wing sections. The outer skins for wings 14, 16 are preferably formed from high strength and lightweight materials such as fiberglass fabric, carbon fabric, fiberglass tape, carbon tape and combinations thereof that may be formed by curing together a plurality of material layers.

Figure 1A:
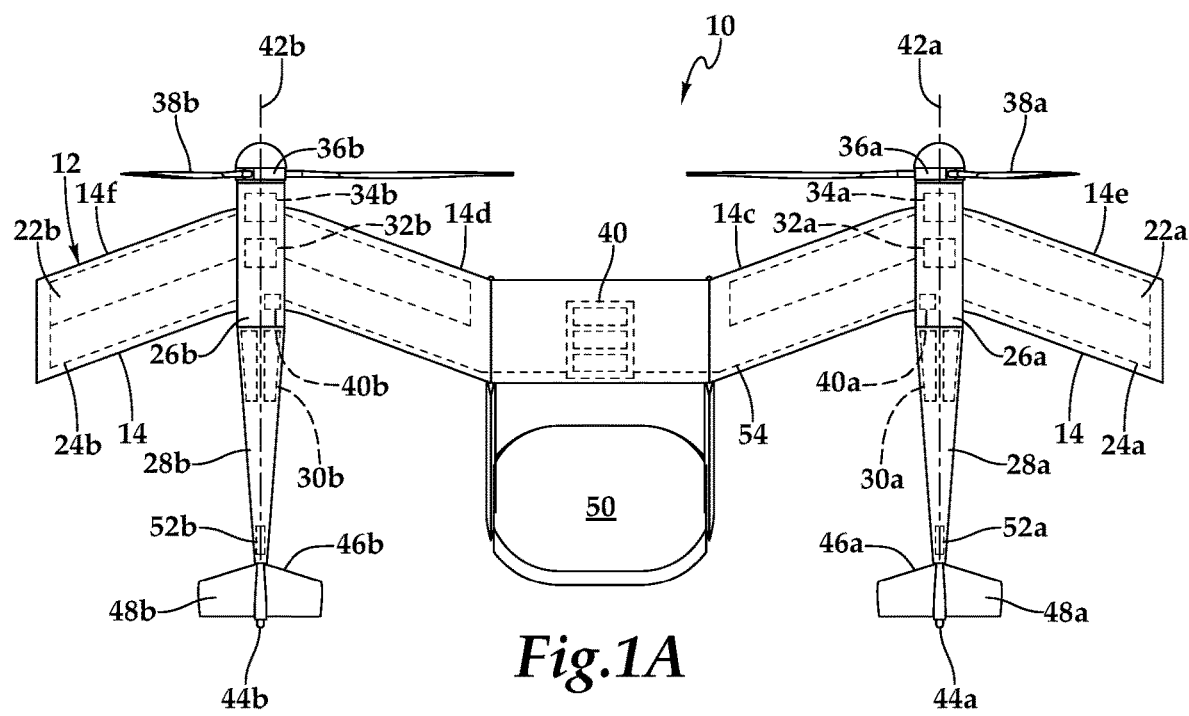
Figure 1D:
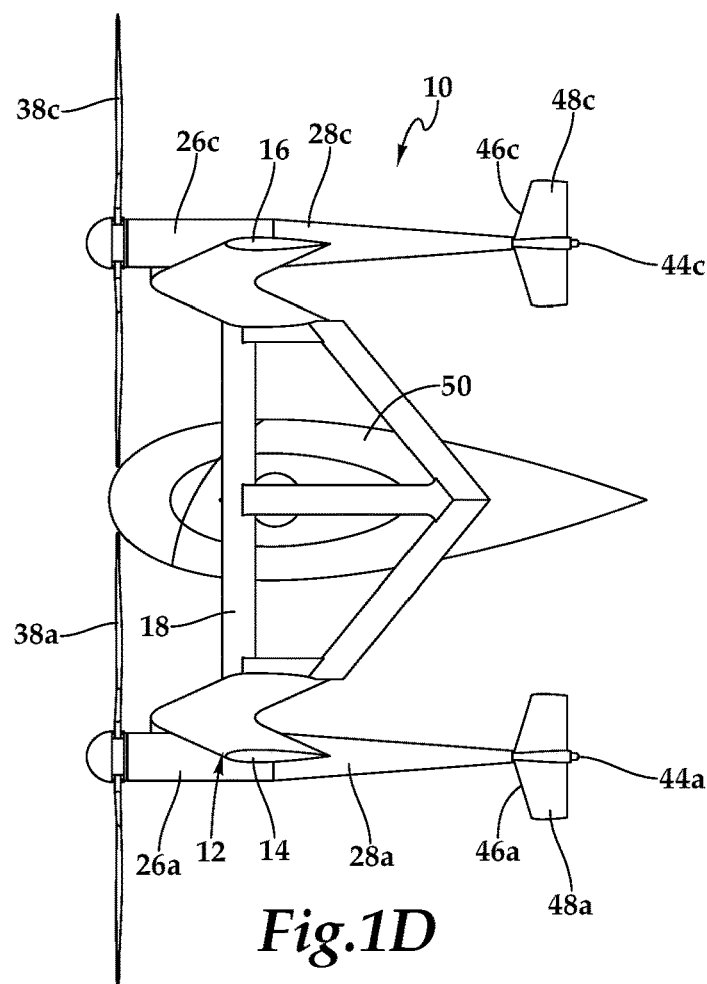

Extending generally perpendicularly between wings 14, 16 are truss structures depicted as pylons 18, 20. Pylons 18, 20 are preferably formed from high strength and lightweight materials such as fiberglass fabric, carbon fabric, fiberglass tape, carbon tape and combinations thereof that may be formed by curing together a plurality of material layers. Preferably, wings 14, 16 and pylons 18, 20 are securably attached together at the respective intersections by bolting, bonding and/or other suitable technique such that airframe 12 becomes a unitary member. As illustrated, wings 14, 16 are polyhedral wings with wing 14 having anhedral sections 14a, 14b and with wing 16 having dihedral sections 16a, 16b, as best seen in FIG. 1B. In this design, any liquid fuel stored in the anhedral sections 14a, 14b or dihedral sections 16a, 16b of wings 14, 16 will gravity feed to sump locations. Wings 14, 16 preferably include central passageways operable to contain energy sources and communication lines. For example, as best seen in FIG. 1A, wing 14 includes energy sources 22a, 22b and communication lines 24a, 24b. Energy sources 22a, 22b may be liquid fuel, batteries or other suitable energy sources. In the case of liquid fuel energy sources 22a, 22b, communication lines 24a, 24b form a fluid distribution network wherein communication lines 24a, 24b access energy sources 22a, 22b proximate the outboard end of wing 14 due to the gravity feed enabled by anhedral sections 14a, 14b. A pumping system may be used to move the liquid fuel from the gravity sumps to the desired use location. In the case of liquid fuel energy sources in wing 16, the communication lines in wing 16 would access the liquid fuel energy sources proximate the inboard end of wing 16 due to the gravity feed enabled by dihedral sections 16a, 16b.

In the illustrated embodiment, the versatile propulsion system includes a plurality of interchangeably propulsion assemblies 26a, 26b, 26c, 26d that are independently attachable to and detachable from airframe 12. As illustrated, propulsion assemblies 26a, 26b, 26c, 26d are positioned on airframe 12 in a close coupled configuration. As illustrated, the versatile propulsion system includes four independently operating propulsion assemblies 26a, 26b, 26c, 26d. It should be noted, however, that a versatile propulsion system of the present disclosure could have any number of independent propulsion assemblies including six, eight, twelve, sixteen or other number of independent propulsion assemblies. In the illustrated embodiment, propulsion assemblies 26a, 26b are securably attached to airframe 12 in a high wing configuration and propulsion assemblies 26c, 26d are securably attached to airframe 12 in a low wing configuration by bolting or other suitable technique, as best seen in FIG. 1B. Preferably, each propulsion assembly 26a, 26b, 26c, 26d includes a nacelle 28a, 28b, 28c, 28d, as best seen in FIG. 1F, that houses a power source, an engine or motor, a drive system, a rotor hub, actuators and an electronics node including, for example, controllers, sensors and communications elements as well as other components suitable for use in the operation of a propulsion assembly. Each propulsion assembly 26a, 26b, 26c, 26d also includes a tail assembly 46a, 46b, 46c, 46d having an active aerosurface 48a, 48b, 48c, 48d, as best seen in FIGS. 1E and 1F. In addition, each propulsion assembly 26a, 26b, 26c, 26d has a rotor assembly including the rotor hub having a plurality of grips such as spindle grips and a proprotor 38a, 38b, 38c, 38d depicted as having three rotor blades each of which is coupled to one of the spindle grips of the respective rotor hub such that the rotor blades are operable to rotate with the spindle grips about respective pitch change axes, as discussed herein.

Aircraft 10 has a liquid fuel flight mode, wherein energy is provided to each of the propulsion assemblies from liquid fuel. For example, in this configuration, each of the propulsion assemblies may be represented by propulsion assembly 26a of FIGS. 1A and 2A. As illustrated, propulsion assembly 26a includes a nacelle 28a, one or more fuel tanks 30a, an internal combustion engine 32a, a drive system 34a, a rotor hub 36a, a proprotor 38a and an electronics node 40a. In the liquid fuel flight mode, the fuel tanks of the propulsion assemblies may be connected to the fluid distribution network of the airframe and serve as feeder tanks for the IC engines. Alternatively, the liquid fuel system may be a distributed system wherein liquid fuel for each propulsion assembly is fully self-contained within the fuel tanks positioned within the nacelles, in which case, the wet wing system described above may not be required. The IC engines may be powered by gasoline, jet fuel, diesel or other suitable liquid fuel. The IC engines may be rotary engines such as dual rotor or tri rotor engines or other high power-to-weight ratio engines. The drive systems may include multistage transmissions operable for reduction drive such that optimum engine rotation speed and optimum proprotor rotation speed are enabled. The drive systems may utilize high-grade roller chains, spur and bevel gears, v-belts, high strength synchronous belts or the like. As one example, the drive system may be a two-stage cogged belt reducing transmission including a 3 to 1 reduction in combination with a 2 to 1 reduction resulting in a 6 to 1 reduction between the engine and the rotor hub.

Aircraft 10 also has an electric flight mode, wherein energy is provided to each of the propulsion assemblies from an electric power source. For example, in this configuration, each of the propulsion assemblies may be represented by propulsion assembly 26b of FIGS. 1A and 2B. As illustrated, propulsion assembly 26b includes a nacelle 28b, one or more batteries 30b, an electric motor 32b, a drive system 34b, a rotor hub 36b, a proprotor 38b and an electronics node 40b. In the electric flight mode, the electric motors of each propulsion assembly are preferably operated responsive to electrical energy from the battery or batteries disposed with that nacelle, thereby forming a distributed electrical system. Alternatively or additionally, electrical power may be supplied to the electric motors and/or the batteries disposed with the nacelles from the energy sources, such as energy sources 22a, 22b, carried by airframe 12 via the communication lines, such as communication lines 24a, 24b.

Aircraft 10 also has a mixed flight mode, wherein energy is provided to some of the propulsion assemblies from an electric power source and energy is provided to other of the propulsion assemblies from liquid fuel. The mixed flight mode of aircraft 10 is evident from the illustrated embodiment of FIG. 1A. As another alternative, some or all of the engines of the propulsion assembly 26a, 26b, 26c, 26d may be hydraulic motors operated responsive to a distributed hydraulic fluid system wherein high pressure hydraulic sources or generators are housed within each nacelle. Alternatively or additionally, a common hydraulic fluid system integral to or carried by airframe 12 may be used.

To transition aircraft 10 among liquid fuel flight mode, electric flight mode and mixed flight mode, propulsion assembly 26a, 26b, 26c, 26d are preferably standardized and interchangeable units that are most preferably line replaceable units enabling easy installation and removal from airframe 12, as discussed herein. In addition, regardless of the current flight mode configuration of aircraft 10, the use of line replaceable units is beneficial in maintenance situations if a fault is discovered with one of the propulsion assemblies. In this case, the faulty propulsion assembly can be decoupled from airframe 12 by simple operations such as unbolting structural members, disconnecting power, data and/or fluid couplings and other suitable procedures. Another propulsion assembly can then be attached to airframe 12 by connecting power, data and/or fluid couplings, bolting structural members together and other suitable procedures.

The rotor assemblies of each propulsion assembly 26a, 26b, 26c, 26d are preferably lightweight, rigid members that may include swashyoke mechanisms operable for collective pitch control and thrust vectoring. Proprotors 38a, 38b, 38c, 38d each include a plurality of proprotor blades that are securably attached to spindle grips of the respective rotor hub. The blades are preferably operable for collective pitch control and may additional be operable for cyclic pitch control. As an alternative, the pitch of the blades may be fixed, in which case, thrust is determined by changes in the rotational velocity of the proprotors. In the illustrated embodiment, the rotor hubs have a tilting degree of freedom to enable thrust vectoring.

To accommodate the tilting degree of freedom of the rotor hubs, wings 14, 16 have a unique swept wing design, which is referred to herein as an M-wing design. For example, as best seen in FIG. 1A, wing 14 has swept forward portions 14c, 14d and swept back portions 14e, 14f. Propulsion assembly 26a is coupled to a wing stanchion positioned between swept forward portion 14c and swept back portion 14e. Likewise, propulsion assembly 26b is coupled to a wing stanchion positioned between swept forward portion 14d and swept back portion 14f. Wing 16 has a similar M-wing design with propulsion assemblies 26c, 26d similarly coupled to wing stanchions positioned between swept forward and swept back portions. In this configuration, each rotor hub is operable to pivot about a mast axis, such as mast axis 42a and mast axis 42b, to control the direction of the thrust vector while avoiding any interference between proprotor 38a, 38b, 38c, 38d and wings 14, 16. In the illustrated embodiment, the maximum angle of the thrust vector may preferably be between about 10 degrees and about 30 degrees, may more preferably be between about 15 degrees and about 25 degrees and may most preferably be about 20 degrees. In embodiments having a maximum thrust vector angle of 20 degrees, the thrust vector may be resolved to any position within a 20-degree cone swung about the mast centerline axis. Notably, using a 20-degree thrust vector yields a lateral component of thrust that is about 34 percent of total thrust. Even though the propulsion assemblies of the present disclosure have been described as having certain nacelles, power sources, engines, drive systems, rotor hubs, proprotors and tail assemblies, it is to be understood by those having ordinary skill in the art that propulsion assemblies having other components or combinations of components suitable for use in a versatile propulsion system are also possible and are considered to be within the scope of the present disclosure.

Figure 1C:
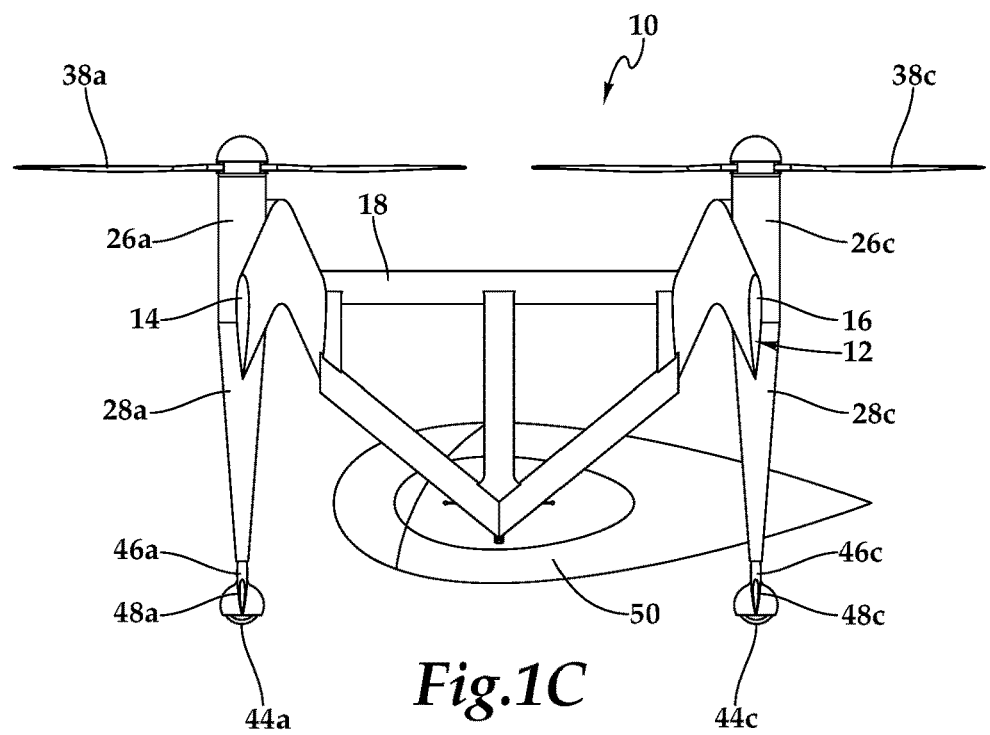
Figure 1F:
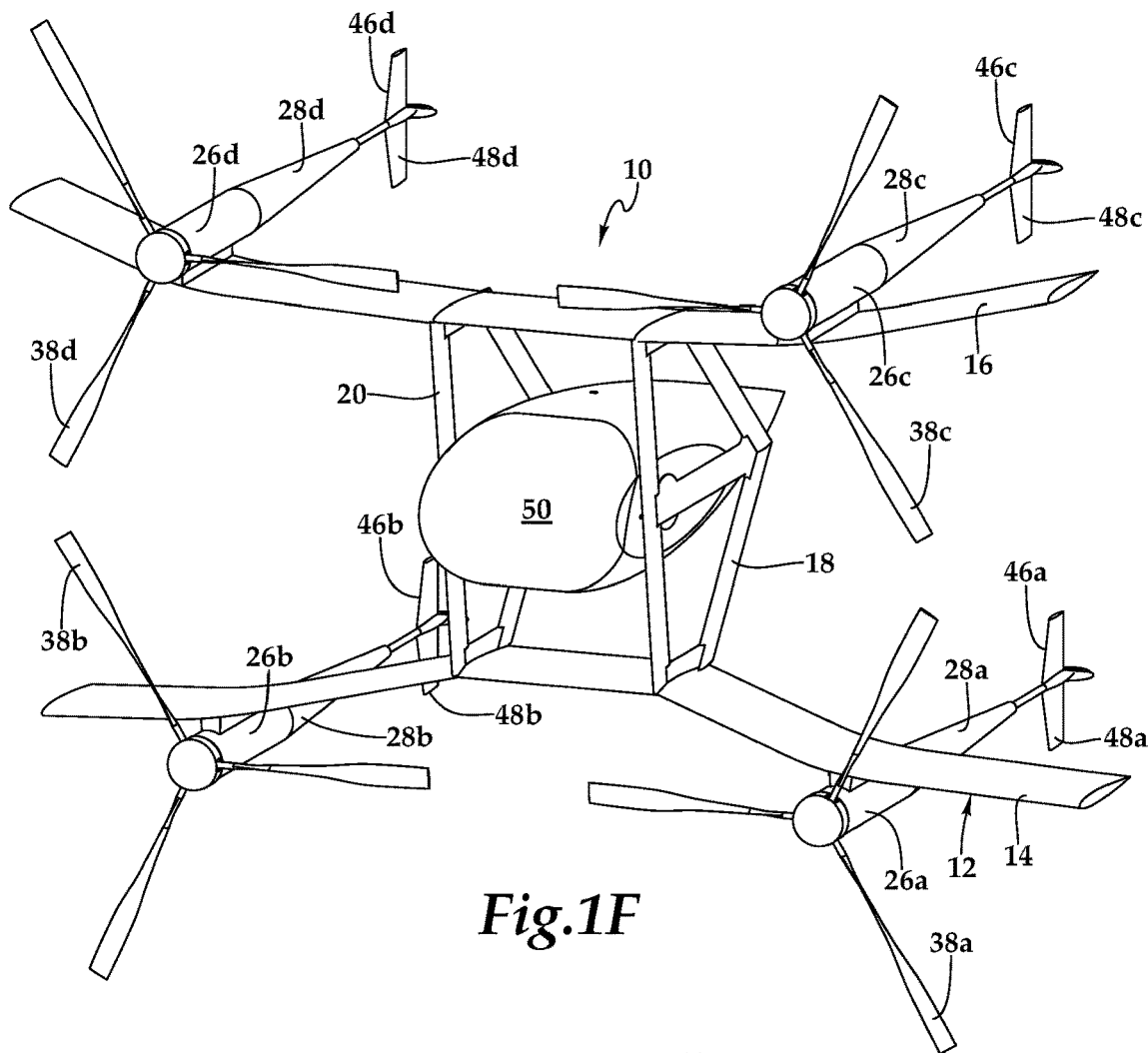
Figure 1E:
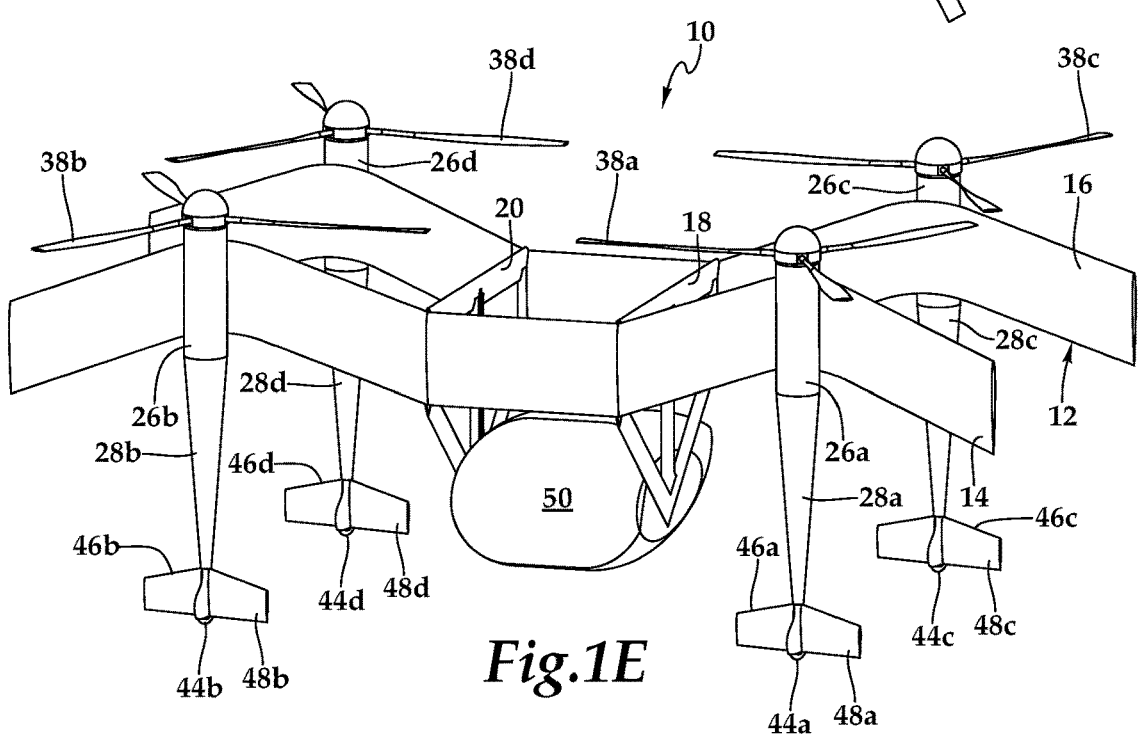

As best seen in FIGS. 1A, 1C and 1E, aircraft 10 includes landing gear depicted as including wheels 44a, 44b, 44c, 44d. The landing gear may be passively operated pneumatic landing struts or actively operated telescoping landing struts disposed within tail assemblies 46a, 46b, 46c, 46d of propulsion assemblies 26a, 26b, 26c, 26d. As discussed herein, wheels 44a, 44b, 44c, 44d enable aircraft 10 to taxi and perform other ground maneuvers. The landing gear may provide a passive brake system or may include active brakes such as an electromechanical braking system or a manual braking system to facilitate parking as required during ground operations and/or passenger ingress and egress. In the illustrated embodiment, each tail assembly 46a, 46b, 46c, 46d includes an active aerosurface 48a, 48b, 48c, 48d that is controlled by an active aerosurface control module of a flight control system 40. During various flight operations, active aerosurfaces 48a, 48b, 48c, 48d may operate as vertical stabilizers, horizontal stabilizers, rudders and/or elevators to selectively provide pitch control and yaw control to aircraft 10.

Figure 2A:
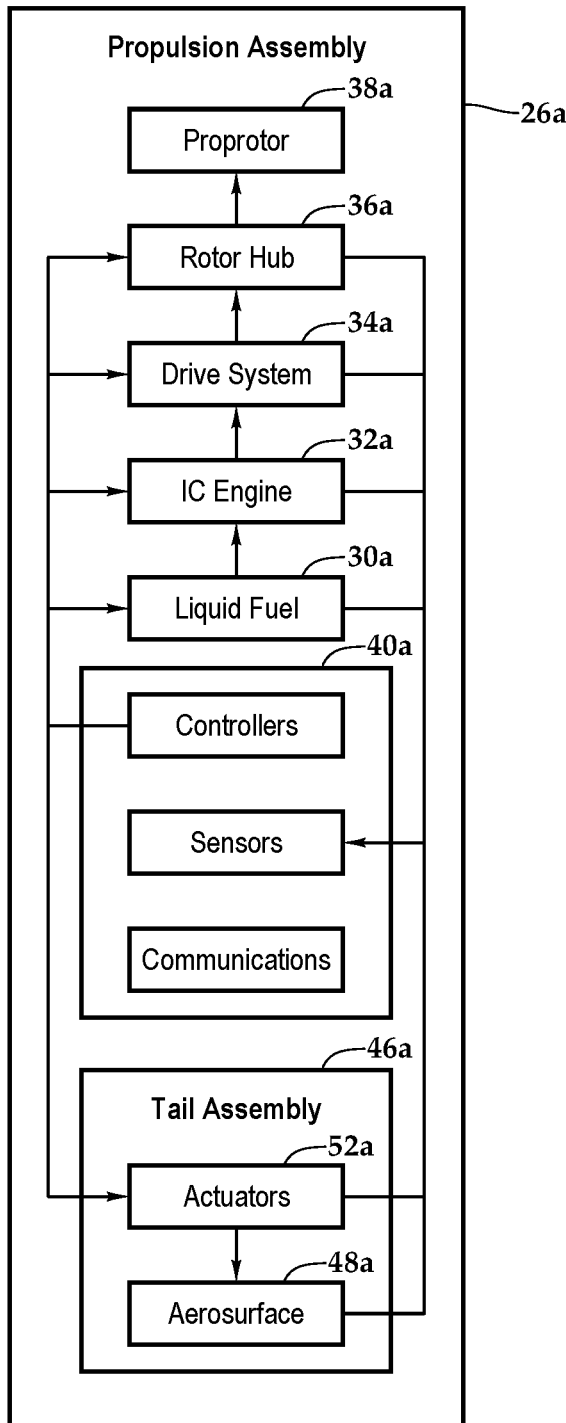
FIGS. 2A-2B are block diagrams of propulsion assemblies for an aircraft in accordance with embodiments of the present disclosure.
Figure 2B:
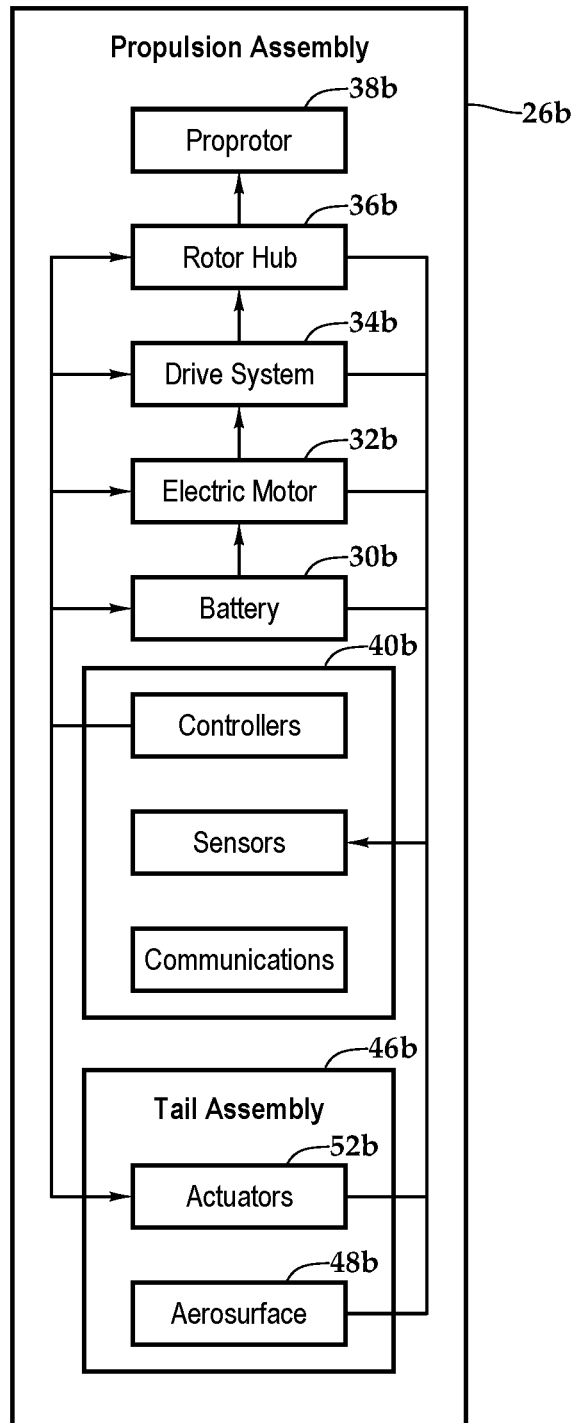

As best seen in FIGS. 1A and 2A-2B, each of the propulsion assemblies 26a, 26b, 26c, 26d includes one or more actuators, such as actuators 52a disposed within nacelle 28a and actuators 52b disposed within nacelle 28b, that are operable to change the orientation, the configuration and/or the position of the active aerosurface 48a, 48b, 48c, 48d. For each propulsion assembly and responsive to commands from the active aerosurface control module of flight control system 40, a first actuator is operable to rotate the tail assembly relative to the nacelle (see FIG. 4A). This operation also rotates the active aerosurface relative to the nacelle such that the active aerosurfaces 48a, 48b, 48c, 48d may be generally parallel to wings 14, 16, as best seen in FIG. 1E, the active aerosurfaces 48a, 48b, 48c, 48d may be generally perpendicular to wings 14, 16, as best seen in FIG. 1F, or the active aerosurfaces 48a, 48b, 48c, 48d may be located in any orientation therebetween. Active aerosurfaces 48a, 48b, 48c, 48d may be fixed, in which case, when active aerosurfaces 48a, 48b, 48c, 48d are generally perpendicular to wings 14, 16 they may be referred to as vertical stabilizers that provide yaw control to aircraft 10. Similarly, when active aerosurfaces 48a, 48b, 48c, 48d are generally parallel to wings 14, 16 they may be referred to as horizontal stabilizers that provide pitch control to aircraft 10.

For each propulsion assembly and responsive to commands from the active aerosurface control system of flight control module 40, a second actuator may be operable to tilt all or a portion of each active aerosurface relative to the tail assembly (see FIGS. 4C-4D). In this case, when active aerosurfaces 48a, 48b, 48c, 48d are generally perpendicular to wings 14, 16 and are tilted relative to tail assemblies 46a, 46b, 46c, 46d, active aerosurfaces 48a, 48b, 48c, 48d may be referred to as rudders that provide yaw control to aircraft 10. Likewise, when active aerosurfaces 48a, 48b, 48c, 48d are generally parallel to wings 14, 16 and are tilted relative to tail assemblies 46a, 46b, 46c, 46d, active aerosurfaces 48a, 48b, 48c, 48d may be referred to as elevators that provide pitch control to aircraft 10.

For each propulsion assembly and responsive to commands from the active aerosurface control module of flight control system 40, a third actuator is operable to translate the tail assembly relative to the nacelle between a retracted configuration and an extended configuration (see FIG. 4B). In the extended configuration of tail assemblies 46a, 46b, 46c, 46d relative to nacelles 28a, 28b, 28c, 28d, as best seen in FIG. 1F, active aerosurfaces 48a, 48b, 48c, 48d are able to generate a greater moment, which can be beneficial in stabilizing aircraft 10. It should be noted that during certain flight maneuvers, it may be beneficial to have active aerosurfaces 48a, 48b, 48c, 48d operating as vertical stabilizers and/or rudders such as during forward flight maneuvers, as best seen in FIG. 1F. Likewise, during other flight maneuvers, it may be beneficial to have active aerosurfaces 48a, 48b, 48c, 48d operating as horizontal stabilizers and/or elevators such as during hover flight maneuvers, vertical takeoff and land flight maneuvers and transition between forward flight and VTOL flight, as best seen in FIG. 1E. In addition, it may be beneficial to have some of active aerosurfaces 48a, 48b, 48c, 48d operating as horizontal stabilizers and/or elevators and other of active aerosurfaces 48a, 48b, 48c, 48d operating as vertical stabilizers and/or rudders during certain flight maneuvers. Further, it may be beneficial to have one or more of active aerosurfaces 48a, 48b, 48c, 48d operating in a position between the horizontal stabilizer position and the vertical stabilizer position during certain flight maneuvers.

Flight control system 40 of aircraft 10, such as a digital flight control system, may be located within a central passageway of wing 14, as best seen in FIG. 1A. In the illustrated embodiment, flight control system 40 is a triply redundant flight control system including three independent flight control computers. Use of triply redundant flight control system 40 having redundant components improves the overall safety and reliability of aircraft 10 in the event of a failure in flight control system 40. Flight control system 40 preferably includes non-transitory computer readable storage media including a set of computer instructions executable by one or more processors for controlling the operation of the versatile propulsion system. Flight control system 40 may be implemented on one or more general-purpose computers, special purpose computers or other machines with memory and processing capability. For example, flight control system 40 may include one or more memory storage modules including, but is not limited to, internal storage memory such as random access memory, non-volatile memory such as read only memory, removable memory such as magnetic storage memory, optical storage, solid-state storage memory or other suitable memory storage entity. Flight control system 40 may be a microprocessor-based system operable to execute program code in the form of machine-executable instructions. In addition, flight control system 40 may be selectively connectable to other computer systems via a proprietary encrypted network, a public encrypted network, the Internet or other suitable communication network that may include both wired and wireless connections.

Flight control system 40 communicates via a communications network 54 with the electronics nodes of each propulsion assembly 26a, 26b, 26c, 26d, such as electronics node 40a of propulsion assembly 26a and electronics node 40b of propulsion assembly 26b, as best seen in FIGS. 1A and 2A-2B. Flight control system 40 receives sensor data from and sends flight command information to the electronics nodes of each propulsion assembly 26a, 26b, 26c, 26d such that each propulsion assembly 26a, 26b, 26c, 26d may be individually and independently controlled and operated. In both manned and unmanned missions, flight control system 40 may autonomously control some or all aspects of flight operation for aircraft 10. Flight control system 40 is also operable to communicate with remote systems, such as a transportation services provider system via a wireless communications protocol. The remote system may be operable to receive flight data from and provide commands to flight control system 40 to enable remote flight control over some or all aspects of flight operation for aircraft 10, in both manned and unmanned missions.

Aircraft 10 includes a pod assembly, illustrated as passenger pod assembly 50, that is selectively attachable to airframe 12 between pylons 18, 20. In the illustrated embodiment, pylons 18, 20 include receiving assemblies for coupling with pod assembly 50. Preferably, the connection between pylons 18, 20 and pod assembly 50 allows pod assembly 50 to rotate and translate relative to airframe 12 during flight operations. In addition, one or more communication channels may be established between pod assembly 50 and airframe 12 when pod assembly 50 is attached therewith. For example, a quick disconnect harness may be coupled between pod assembly 50 and airframe 12 to allow a pilot within pod assembly 50 to receive flight data from and provide commands to flight control system 40 to enable onboard pilot control over some or all aspects of flight operation for aircraft 10.

As best seen in FIG. 1E, aircraft 10 is in a vertical takeoff and landing mode. As illustrated, wings 14, 16 are generally above pod assembly 50 with wing 14 forward of and wing 16 aft of pod assembly 50 and with wings 14, 16 disposed in generally the same horizontal plane. As noted, flight control system 40 independently controls and operates each propulsion assembly 26a, 26b, 26c, 26d. In one example, flight control system 40 is operable to independently control collective pitch and adjust the thrust vector of each propulsion assembly 26a, 26b, 26c, 26d, which can be beneficial in stabilizing aircraft 10 during vertical takeoff, vertical landing and hover. As best seen in FIG. 1F, aircraft 10 is in a forward flight mode. Wings 14, 16 are generally forward of pod assembly 50 with wing 14 below and wing 16 above pod assembly 50 and with wings 14, 16 disposed in generally the same vertical plane. In the illustrated embodiment, the proprotor blades of propulsion assemblies 26a, 26d rotate counterclockwise while the proprotor blades of propulsion assemblies 26b, 26c rotate clockwise to balance the torque of aircraft 10.

Figure 3D:
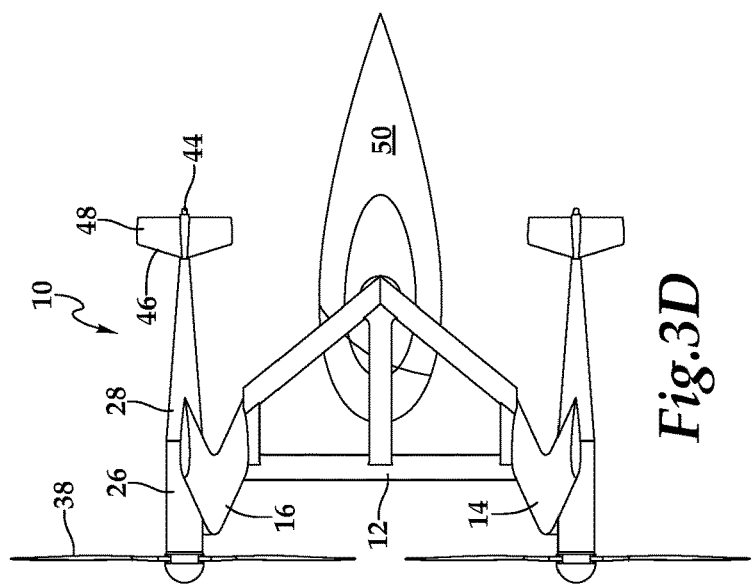

Referring next to FIGS. 3A-3I in the drawings, a sequential flight-operating scenario of aircraft 10 is depicted. In the illustrated embodiment, passenger pod assembly 50 is attached to airframe 12. It is noted, however, that passenger pod assembly 50 may be selectively disconnected from airframe 12 such that a single airframe can be operably coupled to and decoupled from numerous passenger pod assemblies for numerous missions over time. As best seen in FIG. 3A, aircraft 10 is positioned on the ground with the tail assemblies 46 positioned in a passive brake configuration, as discussed herein. When aircraft 10 is ready for a mission, flight control system 40 commences operations to provide flight control to aircraft 10 which may be autonomous flight control, remote flight control, onboard pilot flight control or any combination thereof. For example, it may be desirable to utilize onboard pilot flight control during certain maneuvers such as takeoff and landing but rely on remote or autonomous flight control during hover, forward flight and/or transitions between forward flight and VTOL operations. As best seen in FIG. 3B, aircraft 10 is in its vertical takeoff and landing mode and has lifted pod assembly 50 into the air. Preferably, each tail assembly 46 is rotated about the mast axis 56 of the respective nacelle 28 (see FIG. 4A) such that active aerosurfaces 48 are generally parallel with wings 14, 16 to aid in stabilization during hover and to be properly positioned to provide pitch control during the transition to forward flight. After vertical assent to the desired elevation, aircraft 10 may begin the transition from vertical takeoff to forward flight.

As best seen in FIGS. 3B-3D, as aircraft 10 transitions from vertical takeoff and landing mode to forward flight mode, airframe 12 rotates about pod assembly 50 such that pod assembly 50 is maintained in a generally horizontal attitude for the safety and comfort of passengers, crew and/or cargo carried in pod assembly 50. This is enabled by a passive and/or active connection between airframe 12 and pod assembly 50. For example, a gimbal assembly may be utilized to allow passive orientation of pod assembly 50 relative to airframe 12. This may be achieved due to the shape and the center of gravity of pod assembly 50 wherein aerodynamic forces and gravity tend to bias pod assembly 50 toward the generally horizontal attitude. Alternatively or additionally, a gear assembly, a clutch assembly or other suitably controllable rotating assembly may be utilized that allows for pilot controlled, remote controlled or autonomously controlled rotation of pod assembly 50 relative to airframe 12 as aircraft 10 transitions from vertical takeoff and landing mode to forward flight mode. Preferably, as best seen in FIG. 3D, each tail assembly 46 is rotated about the mast axis 56 of the respective nacelle 28 (see FIG. 4A) such that active aerosurfaces 48 are generally perpendicular with wings 14, 16 to aid in stabilization and provide yaw control during forward flight.

Figure 3E:
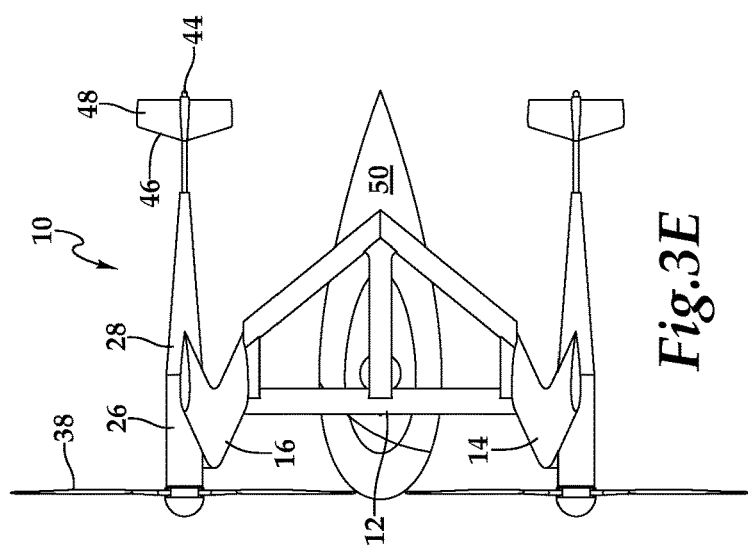

As best seen in FIGS. 3D-3E, once aircraft 10 has completed the transition to forward flight mode, it may be desirable to adjust the center of gravity of aircraft 10 to improve its stability and efficiency. In the illustrated embodiment, this can be achieved by shifting pod assembly 50 forward relative to airframe 12 using an active connection between airframe 12 and pod assembly 50. For example, rotation of a gear assembly of pod assembly 50 relative to a rack assembly of airframe 12 or other suitable translation system may be used to shift pod assembly 50 forward relative to airframe 12 under pilot control, remote control or autonomous control. Preferably, as best seen in FIG. 3E, each tail assembly 46 is extended relative to the respective nacelle 28 (see FIG. 4B) such that active aerosurfaces 48 provide greater stabilization and yaw control during forward flight.

Figure 3F:
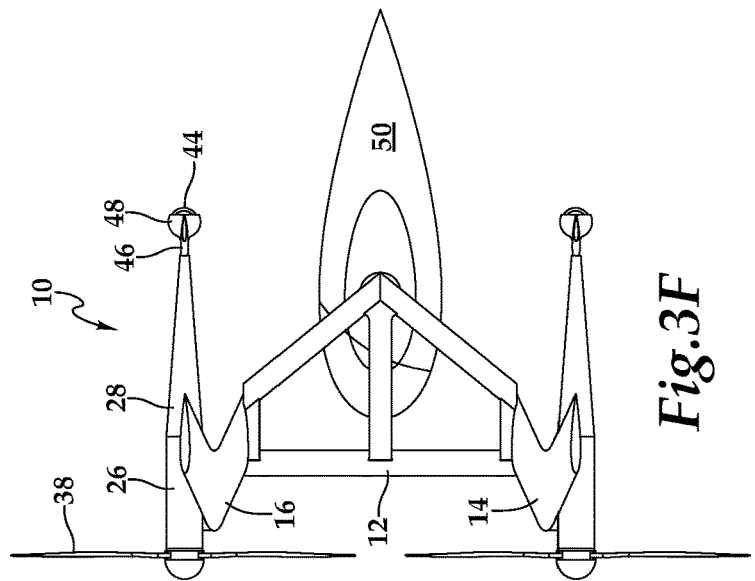

When aircraft 10 begins its approaches to the destination, pod assembly 50 is preferably returned to the aft position relative to airframe 12 and each tail assembly 46 is preferably retracted (see FIG. 4B) and rotated (see FIG. 4A) relative to the respective nacelle 28 such that active aerosurfaces 48 are generally parallel with wings 14, 16, as best seen in FIG. 3F. Aircraft 10 may now begin its transition from forward flight mode to vertical takeoff and landing mode. As best seen in FIGS. 3F-3H, during the transition from forward flight mode to vertical takeoff and landing flight mode, airframe 12 rotates about pod assembly 50 such that pod assembly 50 is maintained in the generally horizontal attitude for the safety and comfort of passengers, crew and/or cargo carried in pod assembly 50. Once aircraft 10 has completed the transition to vertical takeoff and landing flight mode, as best seen in FIG. 3H, aircraft 10 may commence its vertical descent to a surface. After landing, aircraft 10 may engage in ground maneuvers, if desired. Upon completion of any ground maneuvers, each tail assembly 46 is rotated about the mast axis 56 of the respective nacelle 28 (see FIG. 4A) to return to the passive brake configuration, as best seen in FIG. 3I.

Referring next to FIGS. 5A-5H and 6A-6D, the omnidirectional ground maneuver capabilities of aircraft 10 will now be described. As illustrated, aircraft 10 includes an airframe 12 having wings 14, 16. A plurality of propulsion assemblies, referred to individually and collectively as propulsion assembly 26 or propulsion assemblies 26, are attached to airframe 12. Two of the propulsion assemblies 26 are coupled to wing 14 and two of the propulsion assemblies 26 are coupled to wing 16. In the illustrated embodiment, propulsion assemblies 26 are generally symmetrically positioned or disposed about an aircraft rotational axis 58 to provide stability to aircraft 10. Each of the propulsion assemblies 26 includes a nacelle 28 having a mast axis 56, a rotor assembly 60 having a tilting degree of freedom relative to mast axis 56 and a tail assembly 46 rotatable about mast axis 56. It should be noted that each rotor assembly 60 includes a rotor hub 36 and a proprotor 38, as best see in FIG. 1A. Each tail assembly 46 forms a landing gear including at least one wheel 44 having a rotational axis 62. As discussed herein, a flight control system 40 is operable to independently control each of the propulsion assemblies 26 including tilting each rotor assembly 60 and rotating each tail assembly 46. For each propulsion assembly 20, flight control system 40 is operable to tilt rotor assembly 60 in any direction relative to mast axis 56, as best seen in FIGS. 6A-6D, enabling a thrust vector 64 to be resolved within a thrust vector cone relative to mast axis 56. In the illustrated embodiment, thrust vector 64 has a maximum angle relative to mast axis 56 of about twenty degrees. When propulsion assemblies 26 are being operated including rotation of rotor assemblies 60 about mast axis 56 and tilting of rotor assemblies 60 relative to mast axis 56, the thrust vectors 64 generated by rotor assemblies 60 have a vertical component 66 and a horizontal component 68. Importantly, the horizontal component 68 of thrust vectors 64 is operable to provide the energy source required to roll aircraft 10 during ground maneuvers.

The omnidirectional ground maneuver capabilities of aircraft 10 are achieved by controlling thrust vectors 66 of rotor assemblies 60 relative to rotational axes 62 of wheels 44 of tail assemblies 46. For example, for each propulsion assembly 26, rotor assembly 60 and tail assembly 46 have complementary configurations in which the horizontal component 68 of thrust vector 64 is generally perpendicular to rotational axis 62 of wheel 44. In this case, the thrust is pushing aircraft 10 in a direction that efficiently turns wheel 44. In addition, for each propulsion assembly 26, rotor assembly 60 and tail assembly 46 have non complementary configurations in which the horizontal component 68 of thrust vector 64 is not perpendicular to rotational axis 62 of wheel 44. In this case, the thrust may be pushing aircraft 10 in a direction that inefficiently turns wheel 44 or in a direction that does not turn wheel 44.

Figure 5C:
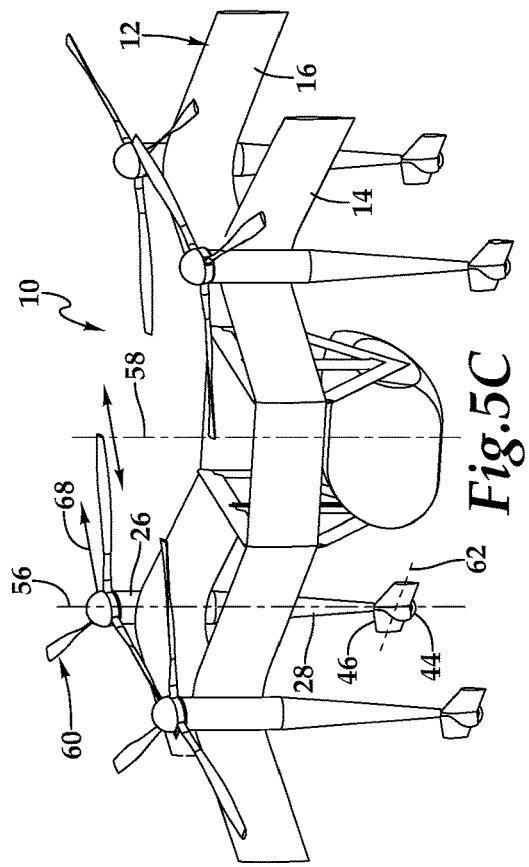
FIGS. 5A-5H are schematic illustrations of an aircraft in various ground maneuver configurations in accordance with embodiments of the present disclosure.
Figure 5A:
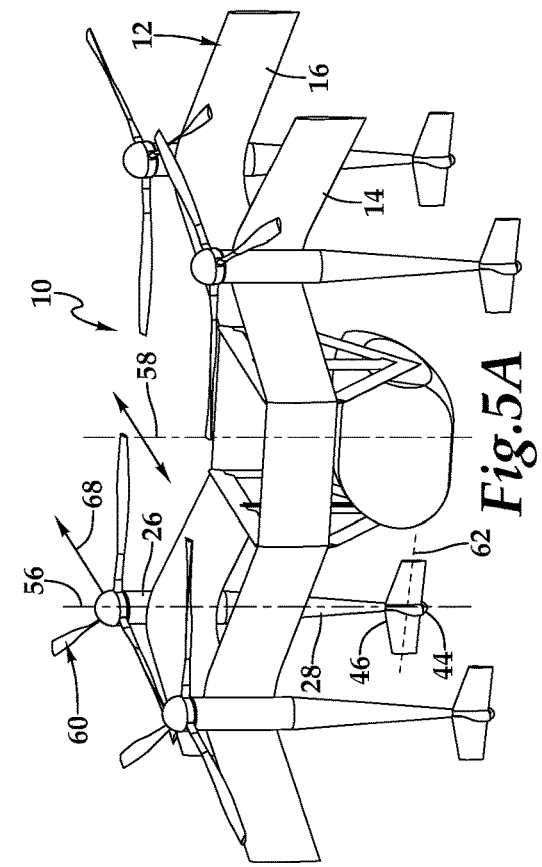

In FIG. 5A, rotor assemblies 60 and tail assemblies 46 have complementary configurations in which the horizontal components 68 of thrust vectors 64 are generally perpendicular to the respective rotational axes 62 of wheels 44. Rotational axes 62 of wheels 44 are generally parallel with wings 14, 16 which creates a fore/aft ground maneuver configuration, as indicated by the directional arrow intersecting aircraft rotational axis 58. In the illustrated embodiment, aircraft 10 would move in the forward direction due to the aftward direction of the horizontal components 68 of thrust vectors 64. As discussed herein, wings 14, 16 are polyhedral wings having anhedral and dihedral sections. Thus, the use of terms such as "generally parallel," "generally perpendicular" and "generally congruent" take into account such angular variations.

Figure 5D:
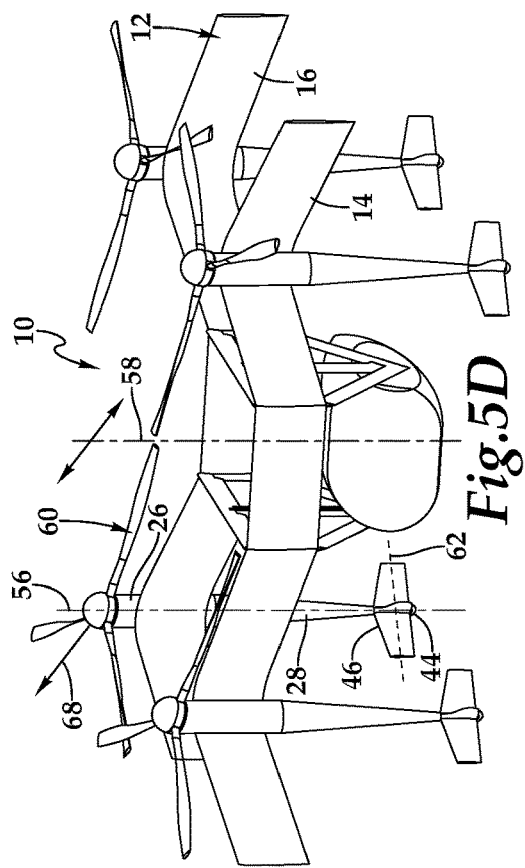
Figure 5B:
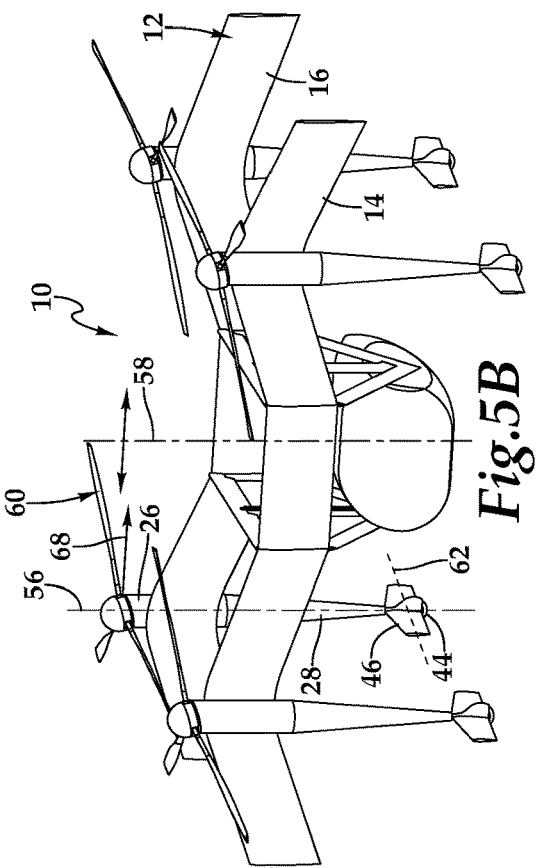

In FIG. 5B, rotor assemblies 60 and tail assemblies 46 have complementary configurations. Rotational axes 62 of wheels 44 are generally perpendicular with wings 14, 16 which creates a lateral ground maneuver configuration, as indicated by the directional arrow intersecting aircraft rotational axis 58. In the illustrated embodiment, aircraft 10 would move to its left, when viewed from the front, due to the horizontal components 68 of thrust vectors 64 pointing to the right. FIGS. 5C and 5D illustrate tail assemblies 46 in two of a plurality of radial ground maneuver configurations, as indicated by the directional arrows intersecting respective aircraft rotational axes 58. Rotor assemblies 60 and tail assemblies 46 have complementary configurations and each of the rotational axes 62 of wheels 44 has been rotated to the same relative orientation between generally parallel and generally perpendicular with wings 14, 16. In this manner, aircraft 10 is operable for omnidirectional ground maneuvers.

Figure 5H:
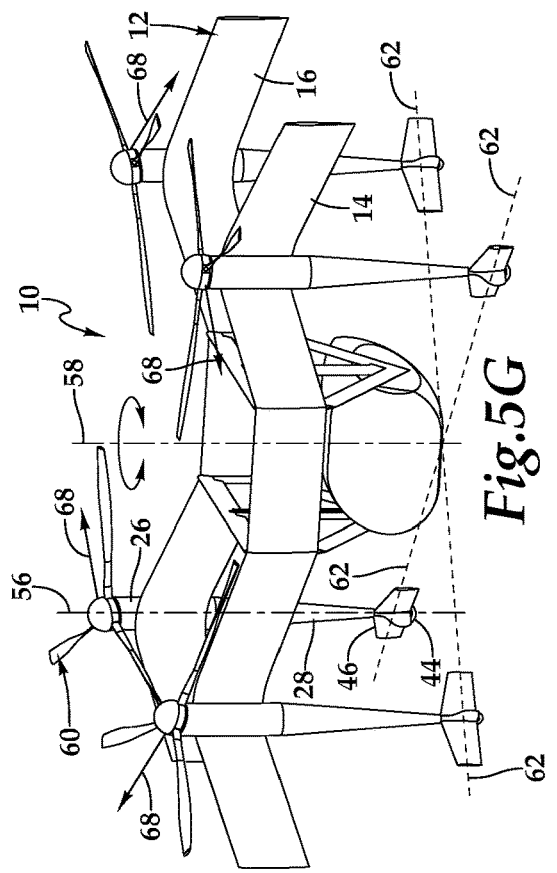
Figure 5F:
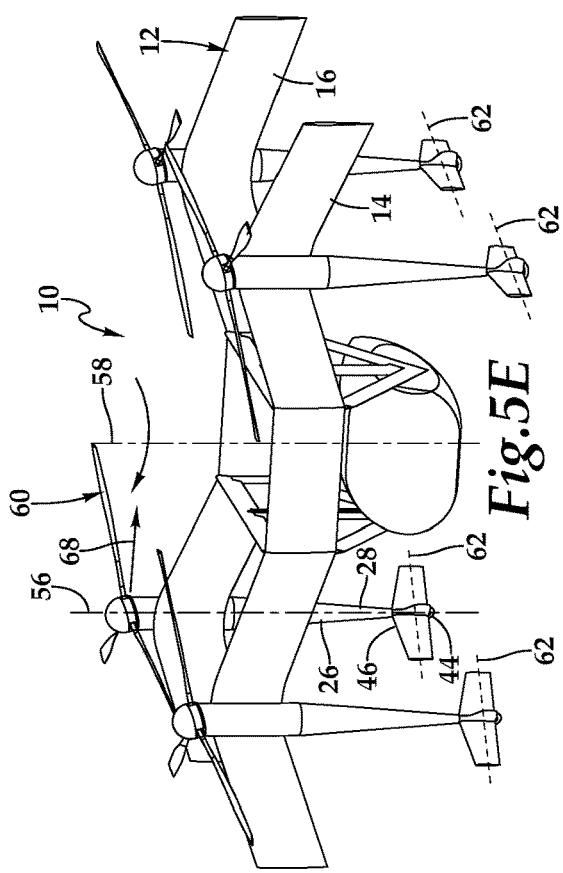
Figure 5G:
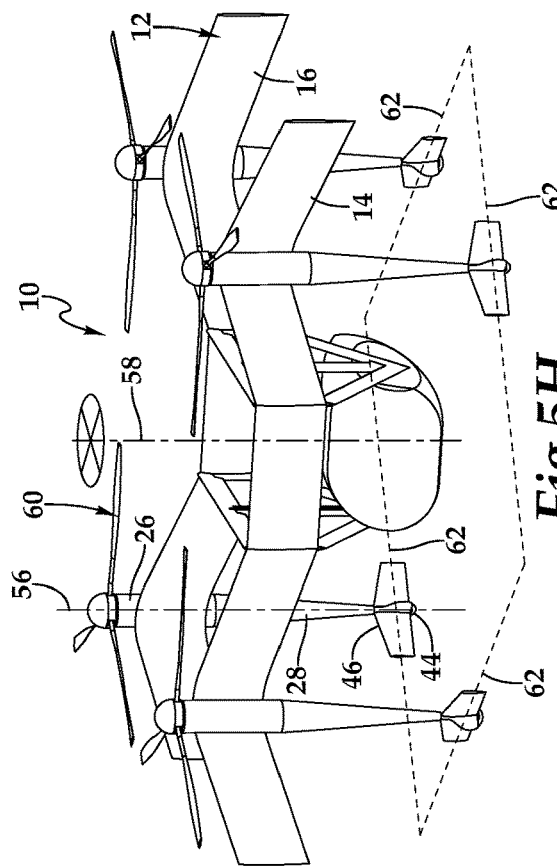
Figure 5E:
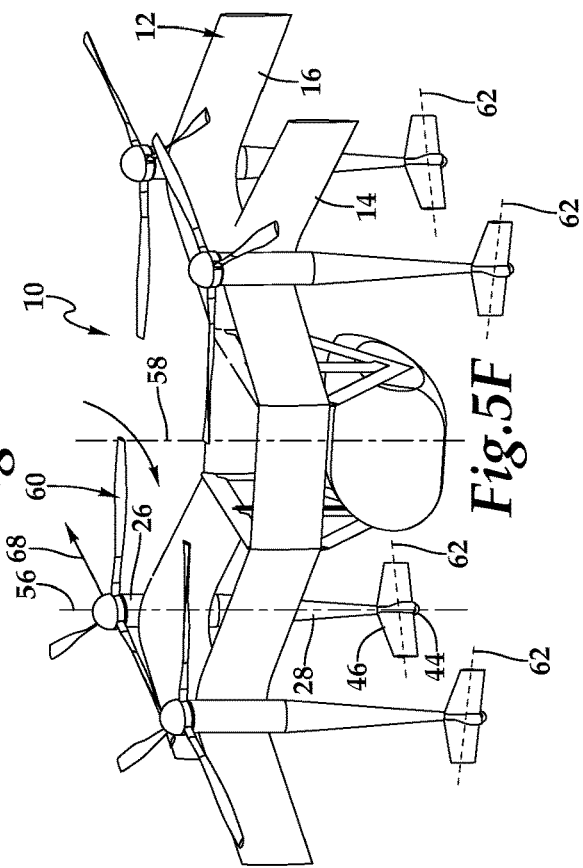
Figure 6C:
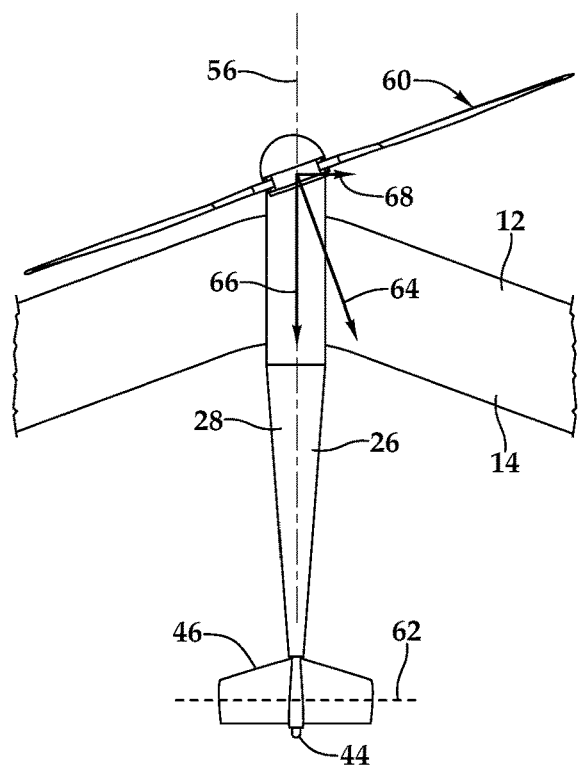
FIGS. 6A-6D are schematic illustrations of a propulsion assembly for an aircraft depicting the tilting degree of freedom and thrust vector generation of a rotor assembly in accordance with embodiments of the present disclosure.
Figure 6D:
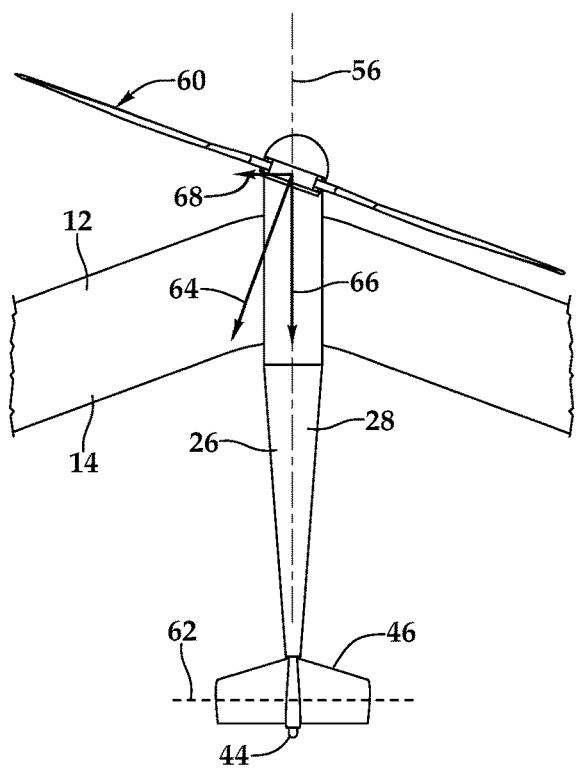
Figure 6A:
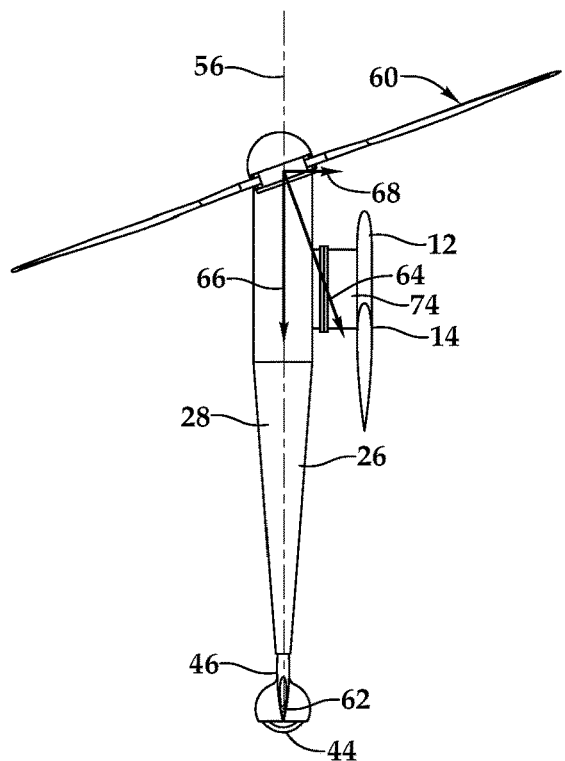
Figure 6B:
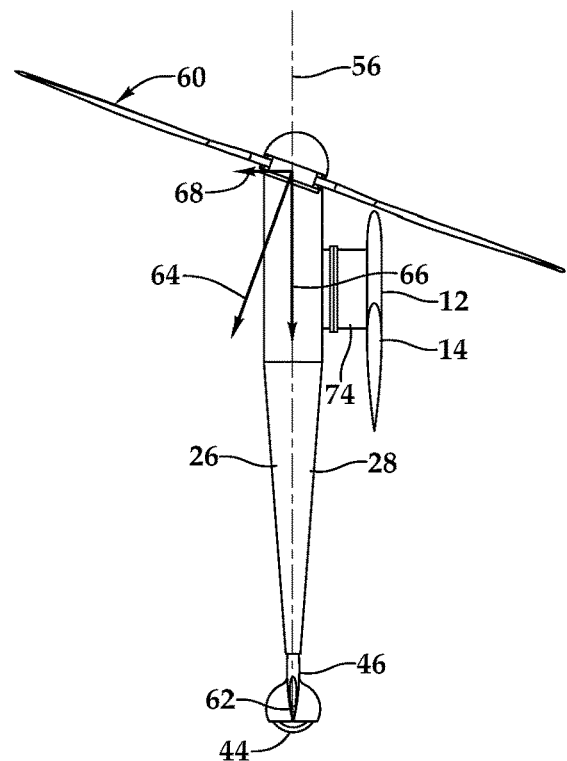

FIG. 5E illustrates tail assemblies 46 in a turning ground maneuver configuration, as indicated by the directional arrow intersecting aircraft rotational axis 58. Aircraft 10 is being urged to the left, when viewed from the front, due to the horizontal components 68 of thrust vectors 64 pointing to the right. As with all the previous examples, rotor assemblies 60 have a common tilting configuration in which each of the rotor assemblies 60 is tilting in the same direction. In this case, however, some of the rotor assemblies 60 and tail assemblies 46 have complementary configurations while others of the rotor assemblies 60 and tail assemblies 46 have non complementary configurations. More specifically, as aircraft 10 moves to the left, the rear rotor assemblies 60 and tail assemblies 46 have complementary configurations in which rotational axes 62 of wheels 44 are generally perpendicular with wings 14, 16. The front rotor assemblies 60 and tail assemblies 46 have non complementary configurations in which rotational axes 62 of wheels 44 have been rotated to a configuration between generally parallel and generally perpendicular with wings 14, 16, thus providing front wheel steering for aircraft 10.

FIG. 5F illustrates tail assemblies 46 in an alternate turning ground maneuver configuration, as indicated by the directional arrow intersecting aircraft rotational axis 58. Aircraft 10 is being urged forward due to the horizontal components 68 of thrust vectors 64 pointing aftward. Rotor assemblies 60 have a common tilting configuration in which each of the rotor assemblies 60 is tilting in the same direction. The front rotor assemblies 60 and tail assemblies 46 have complementary configurations in which rotational axes 62 of wheels 44 are generally parallel with wings 14, 16. The rear rotor assemblies 60 and tail assemblies 46 have non complementary configurations in which rotational axes 62 of wheels 44 have been rotated to a configuration between generally parallel and generally perpendicular with wings 14, 16, thus providing rear wheel steering for aircraft 10. Alternatively or additionally, tail assemblies 46 may have a four wheel steering ground maneuver configuration.

FIG. 5G illustrates tail assemblies 46 in a rotation ground maneuver configuration, as indicated by the directional arrow around aircraft rotational axis 58. Rotor assemblies 60 and tail assemblies 46 have complementary configurations. Rotor assemblies 60, however, have a non common tilting configuration in which rotor assemblies 60 are titling in a plurality of directions and, in the illustrated embodiment, are each tilting in a different direction. In addition, rotational axis 62 of each wheel 44 intersects rotational axis 58 of aircraft 10. In this rotation ground maneuver configuration of rotor assemblies 60 and tail assemblies 46, aircraft 10 will rotate about rotational axis 58 in a counter clockwise direction, when viewed from above.

FIG. 5H illustrates tail assemblies 46 in a passive brake configuration, as indicated by the stop symbol intersecting aircraft rotational axis 58. Rotational axes 62 of adjacent wheels 44 are generally perpendicular with each other. In addition, rotational axis 62 of each wheel 44 does not intersect rotational axis 58 of aircraft 10. Rotor assemblies 60 and tail assemblies 46 are illustrated in non complementary configurations, however, regardless of the relative configuration of rotor assemblies 60 and tail assemblies 46, the horizontal components 68 of any thrust vectors 64 will not cause aircraft 10 to roll in any direction and will not cause aircraft 10 to rotate about rotational axis 58 as the passive brake configuration of tail assemblies 46 prevents such movement.

Referring to FIGS. 7A-7D in the drawings, the connections between propulsion assemblies 26a, 26b, 26c, 26d and airframe 12 will now be discussed. As illustrated, propulsion assemblies 26a, 26b, 26c, 26d are elements of the versatile propulsion system wherein, propulsion assemblies 26a, 26b, 26c, 26d are interchangeably attachable to airframe 12 as line replaceable units. Airframe 12 includes wings 14, 16 and pylons 18, 20. Pod assembly 50 is supported between pylons 18, 20 and is preferably rotatable and translatable relative to airframe 12. As illustrated, wings 14, 16 each have an M-wing design. Wing 14 has swept forward portions 14c, 14d and swept back portions 14e, 14f. Swept forward portion 14c and swept back portion 14e meet at leading apex 14g. Swept forward portion 14d and swept back portion 14f meet at leading apex 14h. Wing 16 has swept forward portions 16c, 16d and swept back portions 16e, 16f. Swept forward portion 16c and swept back portion 16e meet at leading apex 16g. Swept forward portion 16d and swept back portion 16f meet at leading apex 16h. Each of the swept forward portions 14c, 14d, 16c, 16d has a swept angle, which is depicted relative to swept forward portion 16d as angle 70. Each of the swept back portions 14e, 14f, 16e, 16f has a swept angle, which is depicted relative to swept back portion 16f as angle 72. Preferably, each of swept angles 70 are generally congruent with one another, each of swept angles 72 are generally congruent with one another and swept angles 70 are generally congruent with swept angles 72 such that airframe 12 is symmetric. In the illustrated embodiment, swept angles 70, 72 may preferably be between about 10 degrees and about 30 degrees, may more preferably be between about 15 degrees and about 25 degrees and may most preferably be about 20 degrees.

Figure 7B:
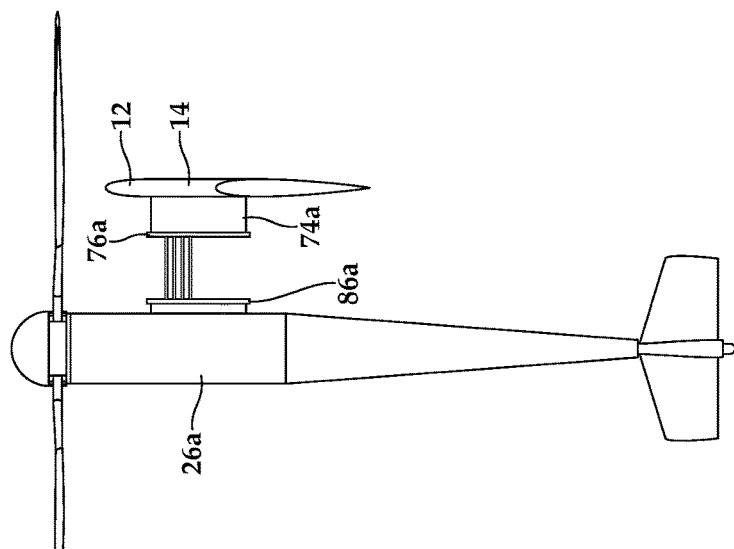
FIGS. 7A-7D are various views depicting the connections between propulsion assemblies and an airframe of an aircraft in accordance with embodiments of the present disclosure.
Figure 7A:
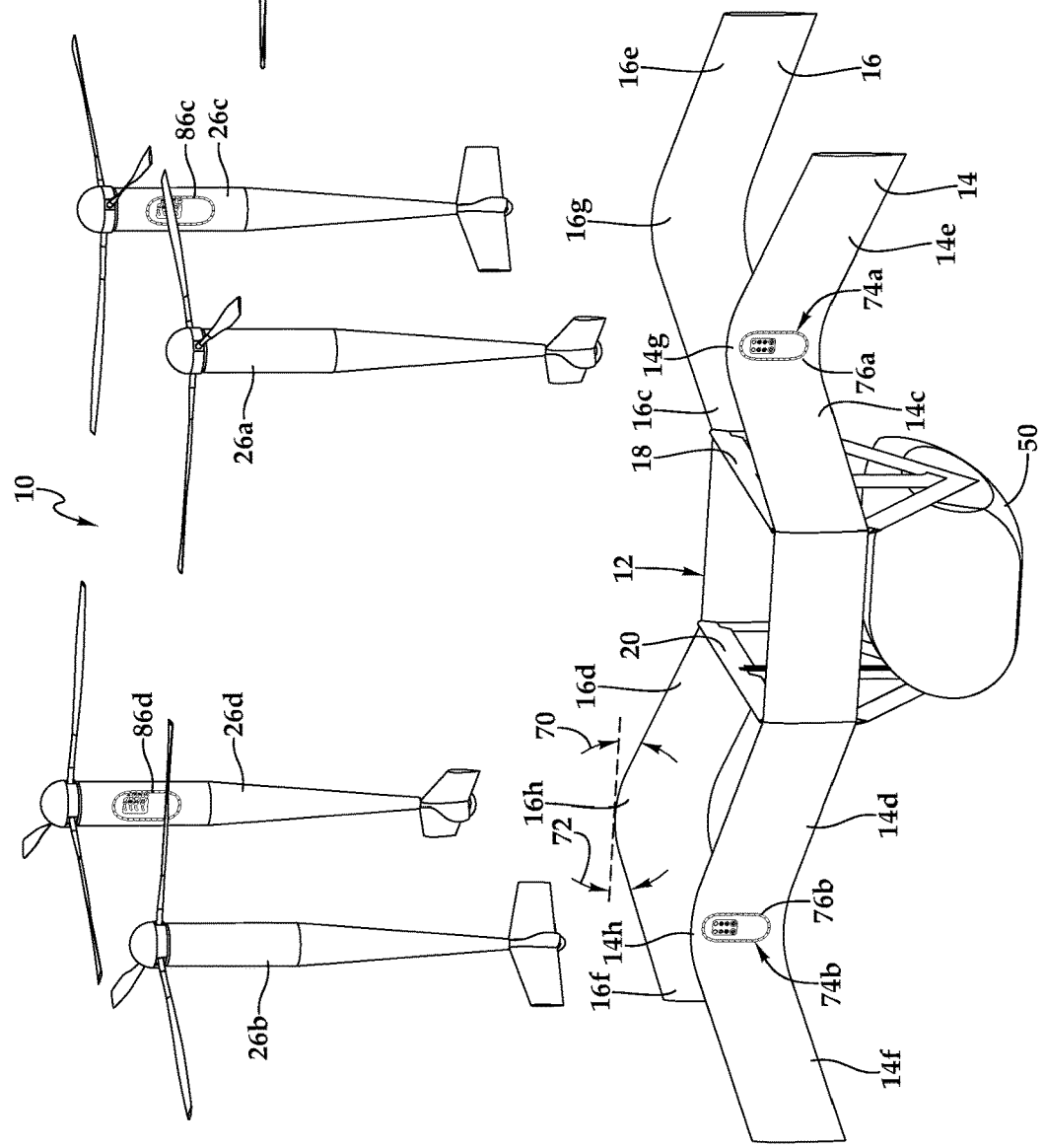
Figure 7D:
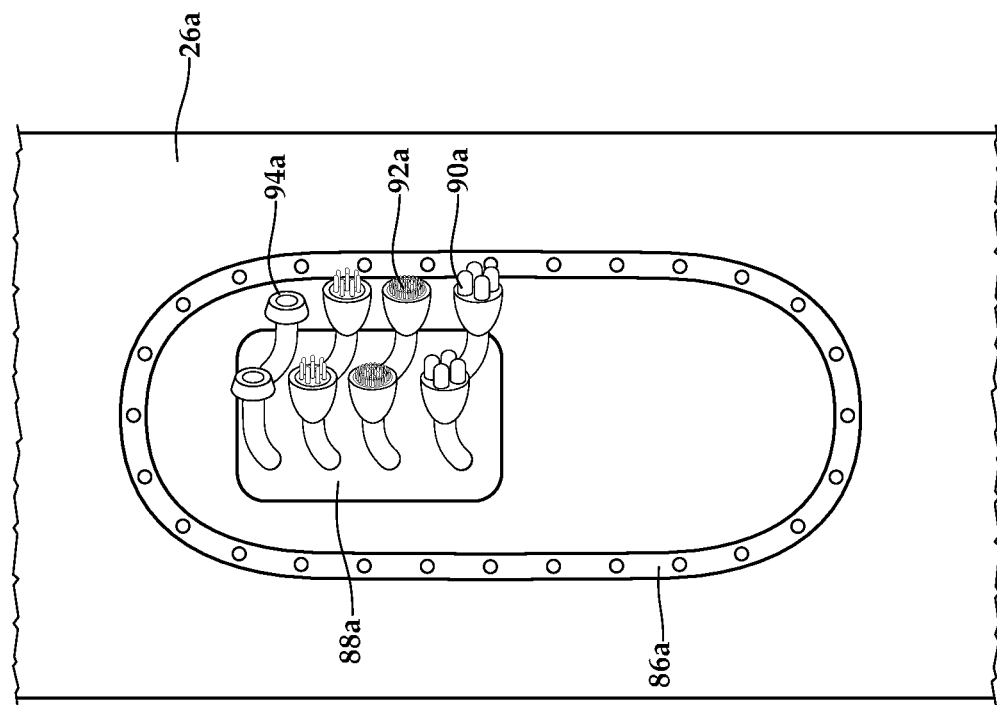
Figure 7C:
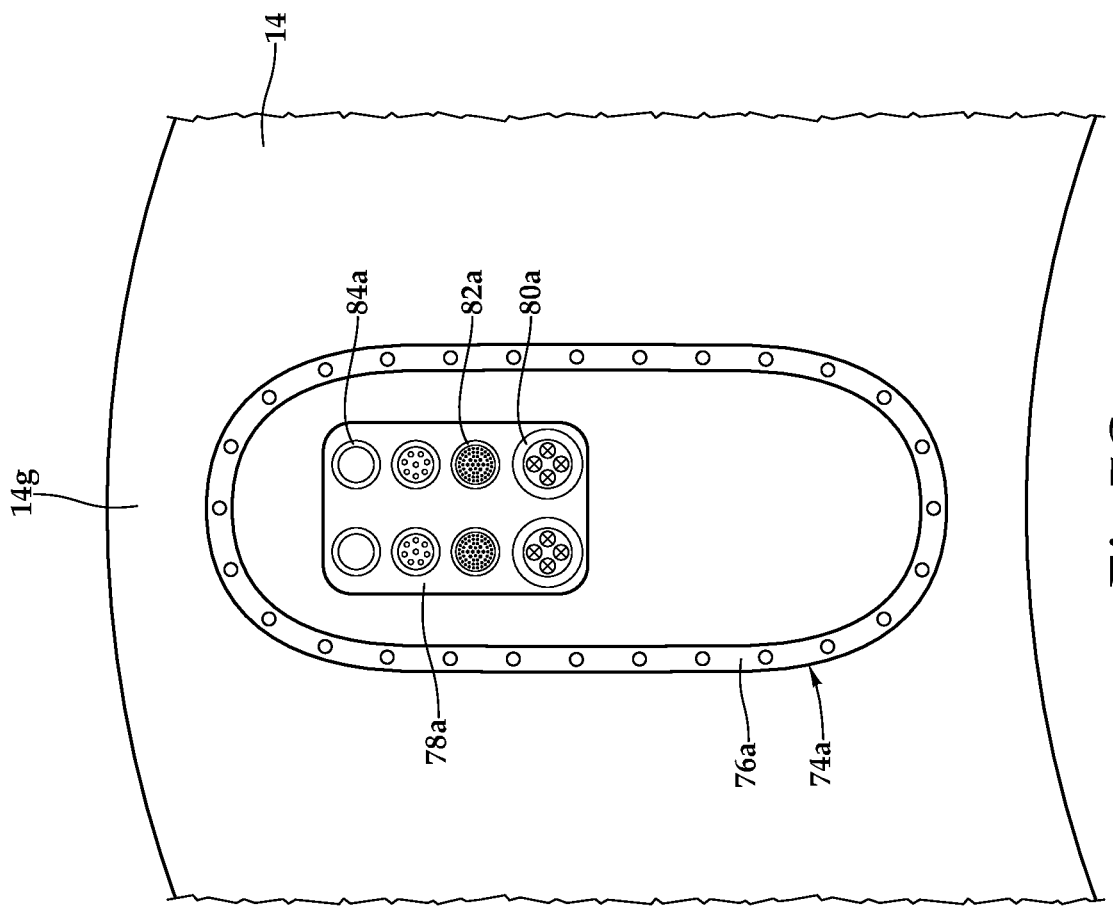

Airframe 12 includes four stanchions 74, only stanchions 74a, 74b positioned on the front of wing 14 being visible in FIG. 7A. Two similar stanchions are positioned aft of wing 16. In the illustrated embodiment, stanchion 74a is located proximate leading apex 14g and stanchion 74b is located proximate leading apex 14h. Similarly, the two stanchions of wing 16 are located proximate leading apex 16g and proximate leading apex 16h, respectively. Each of the stanchions 74 includes a flange 76 having a bolt pattern, only flanges 76a, 76b being visible in FIG. 7A. As best seen in FIG. 7C, stanchion 74a includes an interface panel 78a depicted with two power sockets 80a, four data or communication sockets 82a and two fluid sockets 84a. As illustrated, sockets 80a, 82a, 84a are substantially flush or integrated with panel 78a. As should be apparent to those having ordinary skill in the art, each stanchion of the present disclosure will include a similar panel with similar sockets. In addition, even though a particular arrangement of sockets has been depicted and described, those having ordinary skill in the art should understand that the stanchions of the present disclosure could have other numbers of sockets in other arrangements.

Propulsion assemblies 26a, 26b, 26c, 26d each includes a flange 86, only flanges 86c, 86d being visible in FIG. 7A. Each flange 86 has a bolt pattern that matches the bolt pattern of flanges 76 such that propulsion assemblies 26 can be interchangeably bolted to any one of the stanchions 74 to create a mechanical connection therebetween. As best seen in FIG. 7D, propulsion assembly 26a includes an interface panel 88a depicted with two power cables 90a, four data or communication cables 92a and two fluid cables 94a. Power cables 90a are operable to couple with power sockets 80a to established electrical connections between airframe 12 and propulsion assembly 26a. For example, these connections enable electrical power from batteries 30b of airframe 12 to be provided to components within propulsion assembly 26a such as electronics node 40a, an electric motor and/or other electrical components.

Communication cables 92a are operable to couple with communication sockets 82a to established data communication between airframe 12 and propulsion assembly 26a. For example, these connections enable flight control system 40 to communicate with electronics node 40a to provide command and control information to propulsion assembly 26a and receive sensor and feedback information from propulsion assembly 26a. Fluid cables 94a are operable to couple with fluid sockets 84a to established fluid communication between airframe 12 and propulsion assembly 26a. For example, these connections enable liquid fuel from airframe 12 to be provided to a fuel tank and/or an internal combustion engine of propulsion assembly 26a. Alternatively or additionally, these connections may enable hydraulic fluid from airframe 12 to provide power to hydraulic components within propulsion assembly 26a. As should be apparent to those having ordinary skill in the art, each propulsion assembly of the present disclosure will include a similar panel with similar cables. In addition, even though a particular arrangement of cables has been depicted and described, those having ordinary skill in the art should understand that the propulsion assemblies of the present disclosure could have other numbers of cables in other arrangements that preferably mate with corresponding sockets of the stanchions of the present disclosure.

As illustrated, stanchions 74 provide standoff between propulsion assemblies 26 and wings 14, 16. By providing standoff between propulsion assemblies 26 and wings 14, 16, the aerodynamics of aircraft 10 are improved by effectively creating more wing surface to provide lift during various flight maneuvers. The M-wing design of wings 14, 16 and the attachment of propulsion assemblies 26 to stanchions 74 proximate forward apexes 14g, 14h, 16g, 16h enables to rotor assemblies 60 to be mounted in close proximity to forward apexes 14g, 14h, 16g, 16h and be tilted to generate variable thrust vectors 64. In the illustrated embodiment, each rotor assembly 60 has a tilting degree of freedom relative to the respective mast axis 56 enabling thrust vectors 64 to be resolved within a thrust vector cone about mast axis 56, as best seen in FIGS. 6A-6D. The maximum angle of the thrust vector may preferably be between about 10 degrees and about 30 degrees, may more preferably be between about 15 degrees and about 25 degrees and may most preferably be about 20 degrees. Importantly, the maximum thrust vector angle is preferably generally congruent with swept angles 70, 72 of wings 14, 16, thereby avoiding interference between rotor assemblies 60 and airframe 12.

Figure 8:
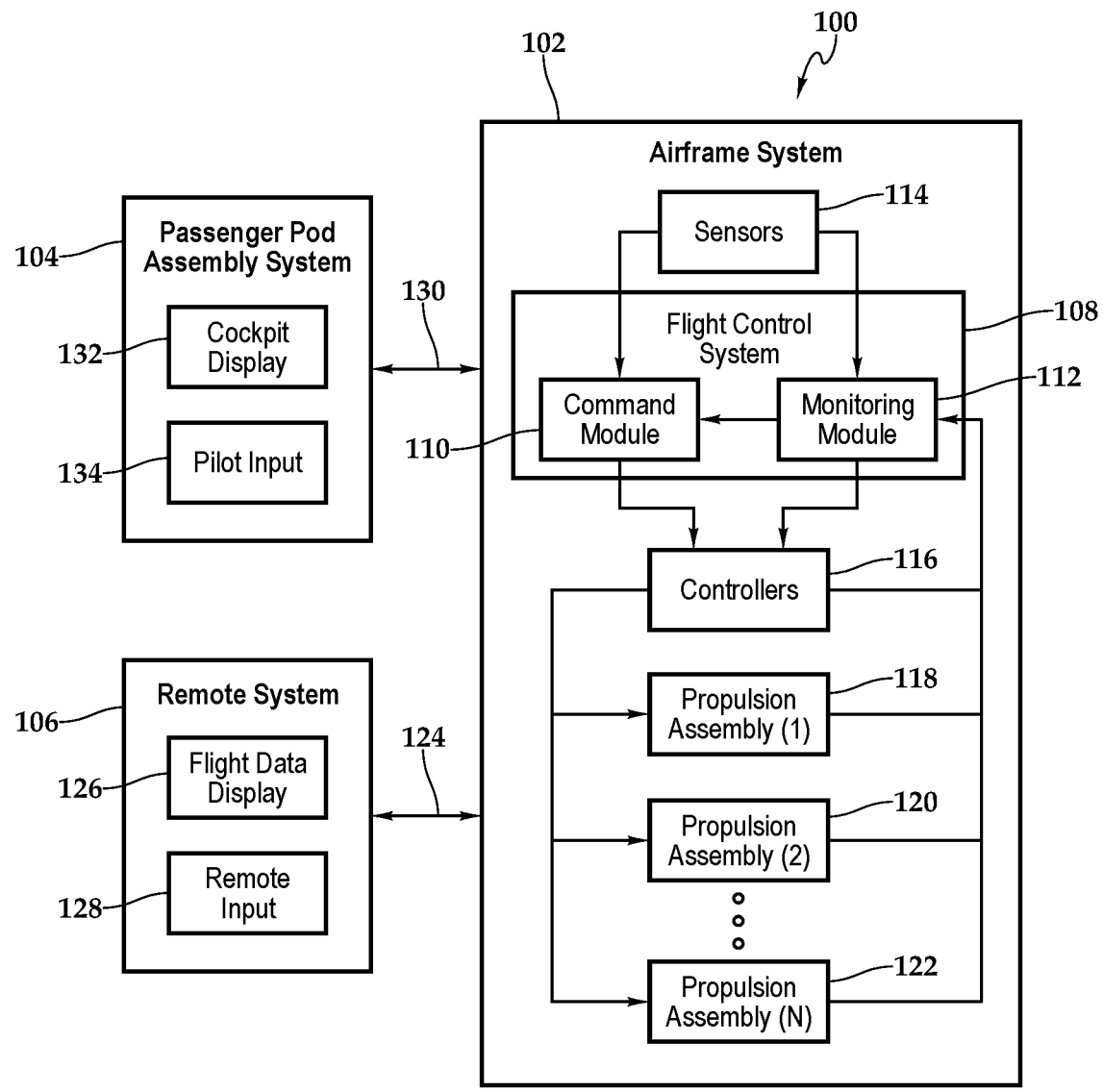
FIG. 8 is a block diagram of an aircraft control system in accordance with embodiments of the present disclosure.

Referring additionally to FIG. 8 in the drawings, a block diagram depicts an aircraft control system 100 operable for use with aircraft 10 of the present disclosure. In the illustrated embodiment, system 100 includes three primary computer based subsystems; namely, an airframe system 102, a passenger pod assembly system 104 and a remote system 106. As discussed herein, the aircraft of the present disclosure may be operated autonomously responsive to commands generated by flight control system 108 that preferably includes a non-transitory computer readable storage medium including a set of computer instructions executable by a processor. Flight control system 108 may be a triply redundant system implemented on one or more general-purpose computers, special purpose computers or other machines with memory and processing capability. For example, flight control system 108 may include one or more memory storage modules including, but is not limited to, internal storage memory such as random access memory, non-volatile memory such as read only memory, removable memory such as magnetic storage memory, optical storage, solid-state storage memory or other suitable memory storage entity. Flight control system 108 may be a microprocessor-based system operable to execute program code in the form of machine-executable instructions. In addition, flight control system 108 may be selectively connectable to other computer systems via a proprietary encrypted network, a public encrypted network, the Internet or other suitable communication network that may include both wired and wireless connections.

In the illustrated embodiment, flight control system 108 includes a command module 110 and a monitoring module 112. It is to be understood by those skilled in the art that these and other modules executed by flight control system 108 may be implemented in a variety of forms including hardware, software, firmware, special purpose processors and combinations thereof. Flight control system 108 receives input from a variety of sources including internal sources such as sensors 114, controllers 116 and propulsion assemblies 118-122, and external sources such as passenger pod assembly system 104, remote system 106 as well as global positioning system satellites or other location positioning systems and the like. For example, flight control system 108 may receive a flight plan including starting and ending locations for a mission from passenger pod assembly system 104 and/or remote system 106. Thereafter, flight control system 108 is operable to autonomously control all aspects of flight of an aircraft of the present disclosure.

For example, during the various operating modes of aircraft 10 including vertical takeoff and landing flight mode, hover flight mode, forward flight mode and transitions therebetween, command module 110 provides commands to controllers 116. These commands enable independent operation of each propulsion assembly 118-122 including tilting the rotor assemblies, adjusting the pitch of the proprotor blades, rotating, tilting and/or extending the tail assemblies and the like. Flight control system 108 receives feedback from controllers 116 and each propulsion assembly 118-122. This feedback is processes by monitoring module 112 that can supply correction data and other information to command module 110 and/or controllers 116. Sensors 114, such as positioning sensors, attitude sensors, speed sensors, environmental sensors, fuel sensors, temperature sensors, location sensors and the like also provide information to flight control system 108 to further enhance autonomous control capabilities.

Some or all of the autonomous control capability of flight control system 108 can be augmented or supplanted by remote flight control from, for example, remotes system 106 such as a transportation services provider. Remote system 106 may include one or computing systems that may be implemented on general-purpose computers, special purpose computers or other machines with memory and processing capability. For example, the computing systems may include one or more memory storage modules including, but is not limited to, internal storage memory such as random access memory, non-volatile memory such as read only memory, removable memory such as magnetic storage memory, optical storage memory, solid-state storage memory or other suitable memory storage entity. The computing systems may be microprocessor-based systems operable to execute program code in the form of machine-executable instructions. In addition, the computing systems may be connected to other computer systems via a proprietary encrypted network, a public encrypted network, the Internet or other suitable communication network that may include both wired and wireless connections. The communication network may be a local area network, a wide area network, the Internet, or any other type of network that couples a plurality of computers to enable various modes of communication via network messages using as suitable communication techniques, such as transmission control protocol/internet protocol, file transfer protocol, hypertext transfer protocol, internet protocol security protocol, point-to-point tunneling protocol, secure sockets layer protocol or other suitable protocol. Remote system 106 communicates with flight control system 108 via a communication link 124 that may include both wired and wireless connections.

Remote system 106 preferably includes one or more flight data display devices 126 configured to display information relating to one or more aircraft of the present disclosure. Display devices 126 may be configured in any suitable form, including, for example, liquid crystal displays, light emitting diode displays, cathode ray tube displays or any suitable type of display. Remote system 106 may also include audio output and input devices such as a microphone, speakers and/or an audio port allowing an operator to communicate with, for example, a pilot on board a pod assembly. The display device 126 may also serve as a remote input device 128 if a touch screen display implementation is used, however, other remote input devices, such as a keyboard or joystick, may alternatively be used to allow an operator to provide control commands to an aircraft being operated responsive to remote control.

Some or all of the autonomous and/or remote flight control of an aircraft of the present disclosure can be augmented or supplanted by onboard pilot flight control from an attached passenger pod assembly including system 104. Passenger pod assembly system 104 preferably includes a non-transitory computer readable storage medium including a set of computer instructions executable by a processor and may be implemented by a general-purpose computer, a special purpose computer or other machine with memory and processing capability. Passenger pod assembly system 104 may include one or more memory storage modules including, but is not limited to, internal storage memory such as random access memory, non-volatile memory such as read only memory, removable memory such as magnetic storage memory, optical storage memory, solid-state storage memory or other suitable memory storage entity. Passenger pod assembly system 104 may be a microprocessor-based system operable to execute program code in the form of machine-executable instructions. In addition, passenger pod assembly system 104 may be connectable to other computer systems via a proprietary encrypted network, a public encrypted network, the Internet or other suitable communication network that may include both wired and wireless connections. Passenger pod assembly system 104 communicates with flight control system 108 via a communication channel 130 that preferably includes a wired connection.

Passenger pod assembly system 104 preferably includes a cockpit display device 132 configured to display information to an onboard pilot. Cockpit display device 132 may be configured in any suitable form, including, for example, as one or more display screens such as liquid crystal displays, light emitting diode displays and the like or any other suitable display type including, for example, a display panel, a dashboard display, an augmented reality display or the like. Passenger pod assembly system 104 may also include audio output and input devices such as a microphone, speakers and/or an audio port allowing an onboard pilot to communicate with, for example, an operator of a remote system. Cockpit display device 132 may also serve as a pilot input device 134 if a touch screen display implementation is used, however, other user interface devices may alternatively be used to allow an onboard pilot to provide control commands to an aircraft being operated responsive to onboard pilot control including, for example, a control panel, mechanical control devices or other control devices. As should be apparent to those having ordinarily skill in the art, through the use of system 100, an aircraft of the present disclosure can be operated responsive to a flight control protocol including autonomous flight control, remote flight control or onboard pilot flight control and combinations thereof.

Figure 9A:
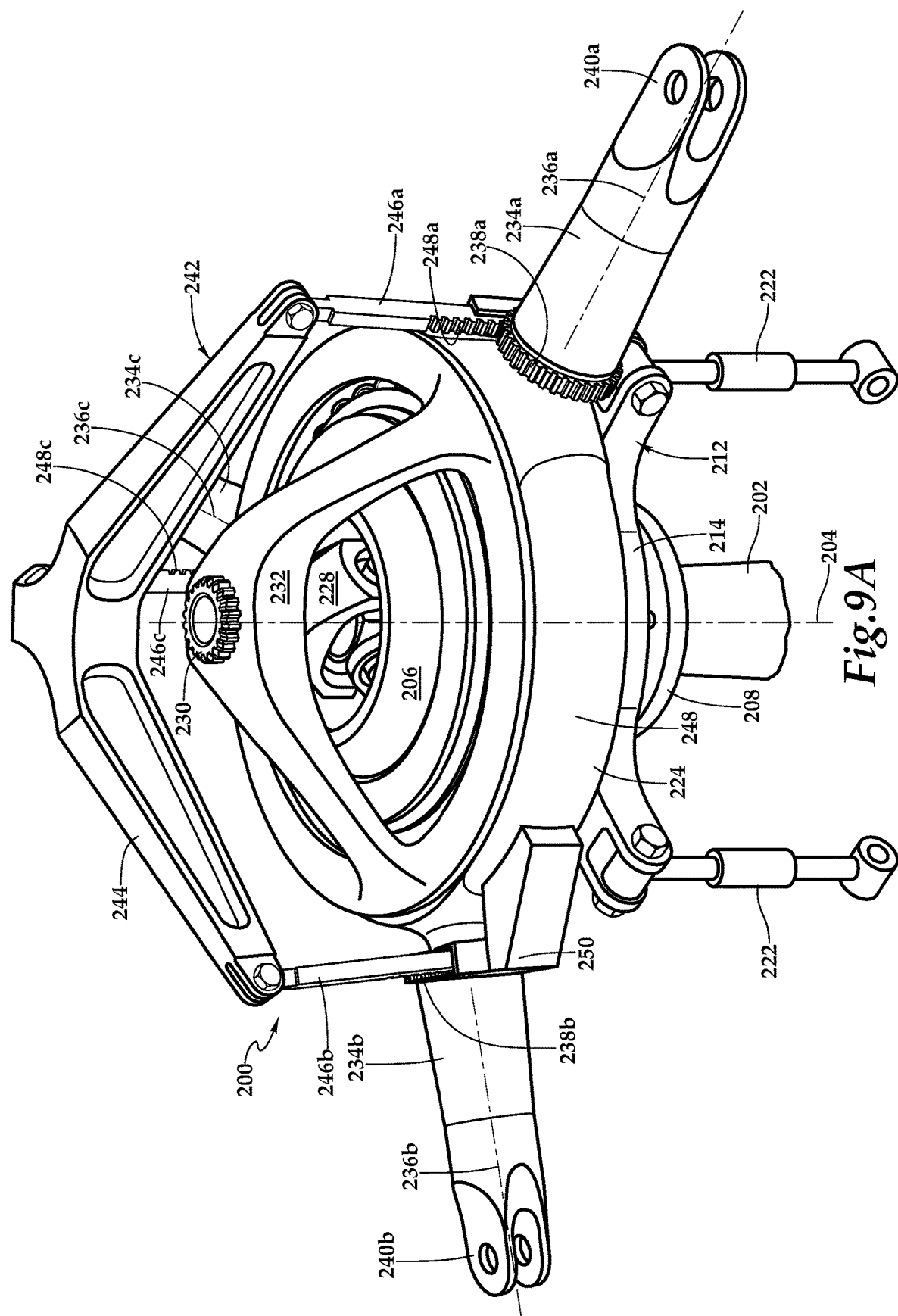
FIGS. 9A-9B are isometric and exploded views of a rotor assembly operable to generate a variable thrust output and a variable thrust vector at a constant rotational speed for an aircraft in accordance with embodiments of the present disclosure.
Figure 9B:
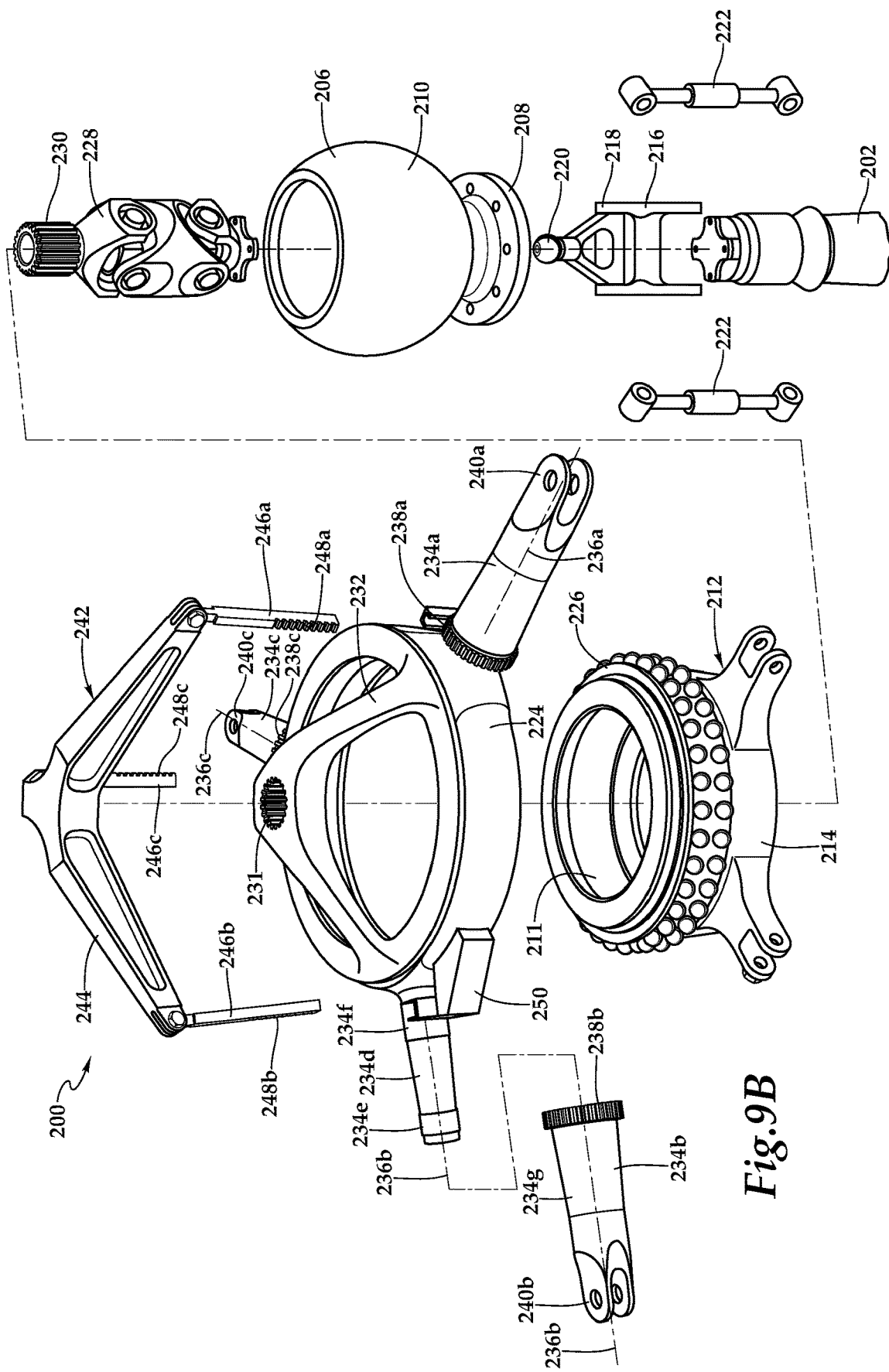

Referring next to FIGS. 9A-9B of the drawings, therein is depicted a rotor assembly for use on an aircraft 10 that is operable to generate a variable thrust output and a variable thrust vector at a constant rotational speed and that is generally designated 200. In the illustrated embodiment, rotor assembly 200 includes a mast 202 that is preferably rotated at a constant speed responsive to torque and rotational energy provided by the engine and drive system of the respective propulsion assembly. Mast 202 rotates about a mast axis 204. A ball joint 206 is positioned about mast 202 but does not rotate with mast 202. Instead, in the illustrated embodiment, ball joint 206 includes a flange 208 that is coupled to the airframe of aircraft 10 by bolting or other suitable technique. Ball joint 206 preferably has an outer spherical surface 210 that is operable to receive an inner spherical surface 211 of a tilt control assembly 212 thereon such that tilt control assembly 212 has a tilting degree of freedom relative to ball joint 206. Tilt control assembly 212 does not rotate with mast 202. Instead, a tilting plate 214 of tilt control assembly 212 is coupled to the airframe with a scissor mechanism 216 that includes a hinge 218 and a ball joint 220 that is received in a ball socket (not visible) of tilting plate 214. Two control rods 222 are coupled to tilting plate 214 such that control rods 222 are operable to push and pull tilting plate 214, thus actuating the tilting degree of freedom of tilt control assembly 212. Control rods 222 may be electrically, hydraulically and/or mechanically controlled responsive to flight control commands received from flight control system 108 via autonomous flight control, remote flight control, onboard pilot flight control or combinations thereof.

A rotor hub 224 is rotatably coupled to tilt control assembly 212 by a bearing assembly depicted as a ball bearing assembly 226, which provides for low friction relative rotation between rotor hub 224 and tilt control assembly 212. Rotor hub 224 is rotated by mast 202 via a rotational joint 228, such as a universal joint or a constant velocity joint, that is coupled to mast 202 by bolting or other suitable technique. Rotational joint 228 provides a torque path between mast 202 and rotor hub 224. Rotational joint 228 has a splined connector 230 that is received within a splined portion 231 of a drive arm assembly 232 of rotor hub 224. The splined mating surfaces allow rotor hub 224 to translate relative to rotational joint 228 and thus mast 202 during rotary operations. Rotor hub 224 rotates in a rotational plane about mast axis 204. The rotational plane may be normal to mast axis 204 when tilt control assembly 212 is not tilted relative to ball joint 206. In addition, the rotational plane may have an angle relative to mast axis 204 when tilt control assembly 212 is tilted relative to ball joint 206 as rotor hub 224 tilts with tilt control assembly 212 responsive to actuation of control rods 222. Rotor hub 224 including a plurality of spindle grips depicted as three spindle grips 234a, 234b, 234c, in the illustrated embodiment. Spindle grips 234a, 234b, 234c extend generally radially outwardly from the body of rotor hub 224. As best seen in the exploded section, spindle grip 234b includes a spindle assembly 234d having outboard and inboard bearings 234e, 234f onto which grip assembly 234g is secured and operable to rotate thereabout. Spindle grips 234a, 234c preferably have similar construction and operation such that spindle grips 234a, 234b, 234c are operable to rotate about respective pitch change axes 236a, 236b, 236c. In the illustrated embodiment, each spindle grip 234a, 234b, 234c includes a respective pinion gear 238a, 238b, 238c. A rotor blade (see for example FIGS. 6A-6D) is coupled to each of the spindle grips 234a, 234b, 234c at respective devises 240a, 240b, 240c by bolting, pinning or other suitable technique. The pitch of the rotor blades is controlled responsive to rotation of the spindle grips 234a, 234b, 234c about the respective pitch change axes 236a, 236b, 236c.

Rotor assembly 200 includes a collective pitch control mechanism 242. In the illustrated embodiment, collective pitch control mechanism 242 includes a spider assembly 244 having a plurality of arms extending therefrom depicted as three arms 246a, 246b, 246c. Each arm 246a, 246b, 246c includes a rack gear 248a, 248b, 248c that is operable to mate with a respective pinion gear 238a, 238b, 238c such that translation of spider assembly 244 relative to rotor hub 224 responsive to operation of one or more actuators 250 rotates each spindle grip 234a, 234b, 234c about the respective pitch change axis 236a, 236b, 236c to collectively adjust the pitch of the rotor blades, thereby generating the variable thrust output at a constant rotational speed. In addition, actuation of tilt control assembly 212 changes the rotational plane of rotor hub 224 relative to mast axis 204, thereby generating the variable thrust vector. As the control rods 222 are operable to tilt tilting plate 214 in any direction relative to ball joint 206, the rotational plane of rotor hub 224 may be tilted in any direction relative to mast axis 204 thus enabling resolution of the thrust vector within a thrust vector cone relative to mast axis 204. In some embodiments, the thrust vector cone may have a maximum angle relative to mast axis 204 of between about ten degrees and about thirty degrees. In other embodiments, the thrust vector cone may have a maximum angle relative to mast axis 204 of between about fifteen degrees and about twenty-five degrees. In additional embodiments, the thrust vector cone may have a maximum angle relative to mast axis 204 of about twenty degrees. It is noted that when rotor assemblies 200 are used in the versatile propulsion system of aircraft 10, each rotor assembly 200 is positioned proximate a leading apex in the M-wing design thus enabling the disclosed resolution of the thrust vector within the thrust vector cone without interference between the rotor blades and the airframe.

Figure 10A:
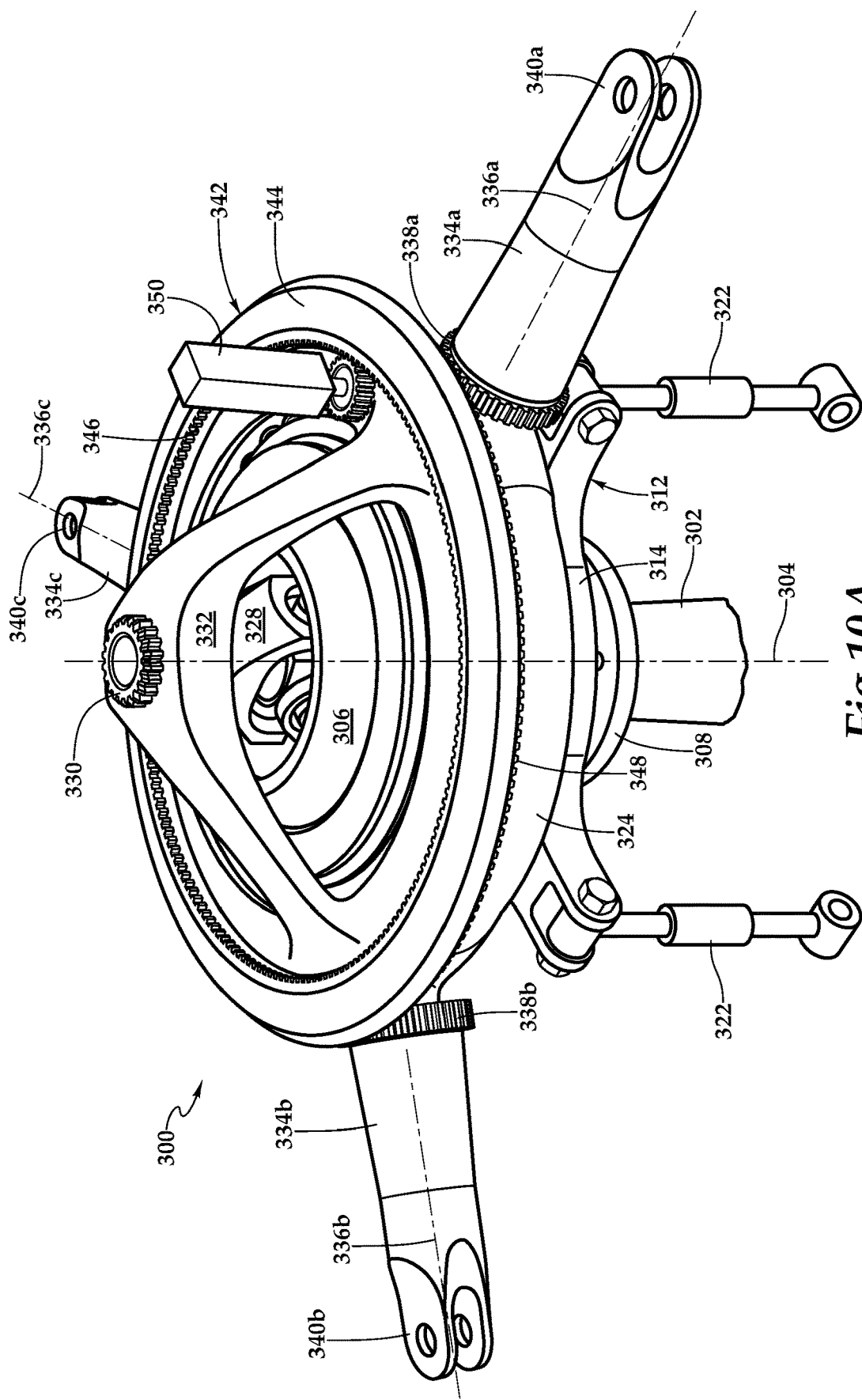
FIGS. 10A-10B are isometric and exploded views of a rotor assembly operable to generate a variable thrust output and a variable thrust vector at a constant rotational speed for an aircraft in accordance with embodiments of the present disclosure.
Figure 10B:
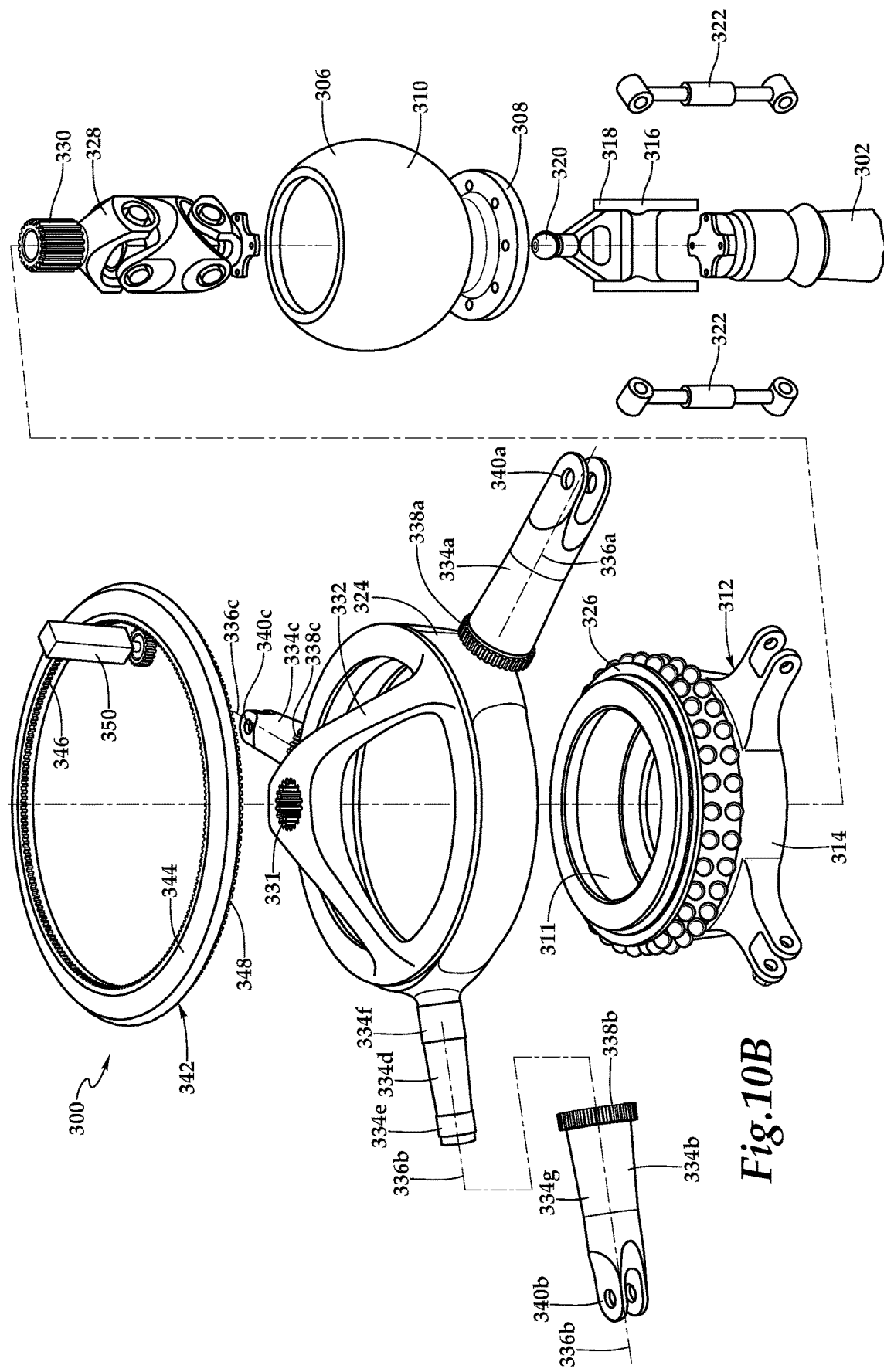

Referring next to FIGS. 10A-10B of the drawings, therein is depicted a rotor assembly for use on an aircraft 10 that is operable to generate a variable thrust output and a variable thrust vector at a constant rotational speed and that is generally designated 300. In the illustrated embodiment, rotor assembly 300 includes a mast 302 that is preferably rotated at a constant speed responsive to torque and rotational energy provided by the engine and drive system of the respective propulsion assembly. Mast 302 rotates about a mast axis 304. A ball joint 306 is positioned about mast 302 but does not rotate with mast 302. Instead, in the illustrated embodiment, ball joint 306 includes a flange 308 that is coupled to the airframe of aircraft 10 by bolting or other suitable technique. Ball joint 306 preferably has an outer spherical surface 310 that is operable to receive an inner spherical surface 311 of a tilt control assembly 312 thereon such that tilt control assembly 312 has a tilting degree of freedom relative to ball joint 306. Tilt control assembly 312 does not rotate with mast 302. Instead, a tilting plate 314 of tilt control assembly 312 is coupled to the airframe with a scissor mechanism 316 that includes a hinge 318 and a ball joint 320 that is received in a ball socket (not visible) of tilting plate 314. Two control rods 322 are coupled to tilting plate 314 such that control rods 322 are operable to push and pull tilting plate 314, thus actuating the tilting degree of freedom of tilt control assembly 312. Control rods 322 may be electrically, hydraulically and/or mechanically controlled responsive to flight control commands received from flight control system 108 via autonomous flight control, remote flight control, onboard pilot flight control or combinations thereof.

A rotor hub 324 is rotatably coupled to tilt control assembly 312 by a bearing assembly depicted as a ball bearing assembly 326, which provides for low friction relative rotation between rotor hub 324 and tilt control assembly 312. Rotor hub 324 is rotated by mast 302 via a rotational joint 328, such as a universal joint or a constant velocity joint, that is coupled to mast 302 by bolting or other suitable technique. Rotational joint 328 provides a torque path between mast 302 and rotor hub 324. Rotational joint 328 has a splined connector 330 that is received within a splined portion 331 of a drive arm assembly 332 of rotor hub 324. The splined mating surfaces allow rotor hub 324 to translate relative to rotational joint 328 and thus mast 302 during rotary operations. Rotor hub 324 rotates in a rotational plane about mast axis 304. The rotational plane may be normal to mast axis 304 when tilt control assembly 312 is not tilted relative to ball joint 306. In addition, the rotational plane may have an angle relative to mast axis 304 when tilt control assembly 312 is tilted relative to ball joint 306 as rotor hub 324 tilts with tilt control assembly 312 responsive to actuation of control rods 322. Rotor hub 324 including a plurality of spindle grips depicted as three spindle grips 334a, 334b, 334c, in the illustrated embodiment. Spindle grips 334a, 334b, 334c extend generally radially outwardly from the body of rotor hub 324. As best seen in the exploded section, spindle grip 334b includes a spindle assembly 334d having outboard and inboard bearings 334e, 334f onto which grip assembly 334g is secured and operable to rotate thereabout. Spindle grips 334a, 334c preferably have similar construction and operation such that spindle grips 334a, 334b, 334c are operable to rotate about respective pitch change axes 336a, 336b, 336c. As illustrated, each spindle grip 334a, 334b, 334c includes a respective pinion gear 338a, 338b, 338c. A rotor blade (see for example FIGS. 6A-6D) is coupled to each of the spindle grips 334a, 334b, 334c at respective devises 340a, 340b, 340c by bolting, pinning or other suitable technique. The pitch of the rotor blades is controlled responsive to rotation of the spindle grips 334a, 334b, 334c about the respective pitch change axes 336a, 336b, 336c.

Rotor assembly 300 includes a collective pitch control mechanism 342. In the illustrated embodiment, collective pitch control mechanism 342 includes a ring assembly 344 having an input gear 346 and an output gear 348 that is operable to mate with each of the pinion gears 338a, 338b, 338c such that rotation of ring assembly 344 relative to rotor hub 324 responsive to operation of one or more actuators 350 rotates each spindle grip 334a, 334b, 334c about the respective pitch change axis 336a, 336b, 336c to collectively adjust the pitch of the rotor blades, thereby generating the variable thrust output at a constant rotational speed. In addition, actuation of tilt control assembly 312 changes the rotational plane of rotor hub 324 relative to mast axis 304, thereby generating the variable thrust vector. As the control rods 322 are operable to tilt tilting plate 314 in any direction relative to ball joint 306, the rotational plane of rotor hub 324 may be tilted in any direction relative to mast axis 304 thus enabling resolution of the thrust vector within a thrust vector cone relative to mast axis 304. In some embodiments, the thrust vector cone may have a maximum angle relative to mast axis 304 of between about ten degrees and about thirty degrees. In other embodiments, the thrust vector cone may have a maximum angle relative to mast axis 304 of between about fifteen degrees and about twenty-five degrees. In additional embodiments, the thrust vector cone may have a maximum angle relative to mast axis 304 of about twenty degrees. It is noted that when rotor assemblies 300 are used in the versatile propulsion system of aircraft 10, each of rotor assembly 300 is positioned proximate a leading apex in the M-wing design thus enabling the thrust vector to be resolved within the thrust vector cone without interference between the rotor blades and the airframe.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A rotor assembly for an aircraft operable to generate a variable thrust vector, the aircraft including an airframe, the rotor assembly comprising:
   a mast rotatable relative to the airframe about a mast axis;
   a ball joint coupled to the airframe and non rotatable with the mast;
   a tilt control assembly positioned on the ball joint and having a tilting degree of freedom relative to the ball joint, the tilt control assembly non rotatable with the mast;
   a constant velocity joint assembly coupled to the mast and rotated therewith, the constant velocity joint assembly disposed at least partially within the ball joint;
   a rotor hub coupled to the constant velocity joint assembly and rotated therewith in a rotational plane about the mast axis, the rotor hub rotatably coupled to the tilt control assembly and tiltable therewith, the rotor hub including a plurality of grips; and
   a plurality of rotor blades each coupled to one of the grips;
   wherein, the tilt control assembly is configured to be actuated in the tilting degree of freedom to change the rotational plane of the rotor hub relative to the mast axis, thereby generating the variable thrust vector.

2. The rotor assembly as recited in claim 1 wherein the tilt control assembly further comprises a tilting plate and a plurality of actuators operable to tilt the tilting plate relative to the ball joint to change the rotational plane of the rotor hub relative to the mast axis, thereby enabling resolution of the thrust vector within a thrust vector cone.

3. The rotor assembly as recited in claim 2 wherein the thrust vector cone has a maximum angle relative to the mast axis of between ten degrees and thirty degrees.

4. The rotor assembly as recited in claim 2 wherein the thrust vector cone has a maximum angle relative to the mast axis of between fifteen degrees and twenty-five degrees.

5. The rotor assembly as recited in claim 2 wherein the thrust vector cone has a maximum angle relative to the mast axis of twenty degrees.

6. The rotor assembly as recited in claim 1 further comprising a bearing assembly disposed between the tilt control assembly and the rotor hub to enable relative rotation therebetween.

7. The rotor assembly as recited in claim 6 wherein the bearing assembly further comprises a ball bearing assembly.

8. The rotor assembly as recited in claim 1 wherein the constant velocity joint assembly further comprises a splined connector.

9. The rotor assembly as recited in claim 8 wherein the rotor hub further comprises a drive arm assembly having a splined portion that is coupled to the splined connector of the constant velocity joint assembly.

10. The rotor assembly as recited in claim 9 wherein the drive arm assembly is configured to translate relative to the constant velocity joint assembly during rotary operations.

11. The rotor assembly as recited in claim 1 wherein each of the grips further comprises a spindle grip rotatable about a pitch change axis; and
   wherein, each of the rotor blades is rotatable with the respective spindle grip about the respective pitch change axis.

12. The rotor assembly as recited in claim 11 further comprising a collective pitch control mechanism coupled to and rotatable with the rotor hub, the collective pitch control mechanism operably associated with each spindle grip such that actuation of the collective pitch control mechanism rotates each spindle grip about the respective pitch change axis to collectively adjust the pitch of the rotor blades.

13. An aircraft comprising:
   an airframe;
   a propulsion system attached to the airframe, the propulsion system including a plurality of propulsion assemblies each having a rotor assembly; and
   a flight control system operable to independently control each of the propulsion assemblies;
   the rotor assemblies each comprising:
   a mast rotatable relative to the airframe about a mast axis;
   a ball joint coupled to the airframe and non rotatable with the mast;
   a tilt control assembly positioned on the ball joint and having a tilting degree of freedom relative to the ball joint, the tilt control assembly non rotatable with the mast;
   a constant velocity joint assembly coupled to the mast and rotated therewith, the constant velocity joint assembly disposed at least partially within the ball joint,
   a rotor hub coupled to the constant velocity joint assembly and rotated therewith in a rotational plane about the mast axis, the rotor hub rotatably coupled to the tilt control assembly and tiltable therewith, the rotor hub including a plurality of grips; and
   a plurality of rotor blades each coupled to one of the grips;
   wherein, the tilt control assembly is configured to be actuated in the tilting degree of freedom to change the rotational plane of the rotor hub relative to the mast axis, thereby generating a variable thrust vector.

14. The aircraft as recited in claim 13 wherein each of the tilt control assemblies further comprises a tilting plate and a plurality of actuators operable to tilt the tilting plate about the ball joint to change the rotational plane of the rotor hub relative to the mast axis, thereby enabling resolution of the thrust vector within a thrust vector cone.

15. The aircraft as recited in claim 14 wherein the thrust vector cone has a maximum angle relative to the mast axis of between ten degrees and thirty degrees.

16. The aircraft as recited in claim 14 wherein the thrust vector cone has a maximum angle relative to the mast axis of between fifteen degrees and twenty-five degrees.

17. The aircraft as recited in claim 14 wherein the thrust vector cone has a maximum angle relative to the mast axis of twenty degrees.

18. The aircraft as recited in claim 13 wherein the airframe further comprises first and second wings each having an M-wing design with two leading apexes, each of the rotor assemblies positioned proximate one of the leading apexes.

19. The aircraft as recited in claim 13 further comprising a passenger pod assembly rotatably attached to the airframe.

20. The aircraft as recited in claim 13 wherein the flight control system is configured to control the propulsion assemblies responsive to at least one of onboard pilot flight control, remote flight control, autonomous flight control and combinations thereof.

* * * * *